United States Patent [19]
Ishikura et al.

[11] Patent Number: 6,052,565
[45] Date of Patent: Apr. 18, 2000

[54] MOBILE COMMUNICATION TERMINAL APPARATUS WITH DATA COMMUNICATION FUNCTION

[75] Inventors: Akira Ishikura, Tokyo; Kuniyoshi Marui, Tokorozawa, both of Japan

[73] Assignee: Kabushiki Kaisha Toshiba, Kawasaki, Japan

[21] Appl. No.: 08/887,328

[22] Filed: Jul. 2, 1997

[30] Foreign Application Priority Data

Jul. 3, 1996 [JP] Japan ..................................... 8-173439

[51] Int. Cl.⁷ .................................................. H04M 11/00
[52] U.S. Cl. ......................... 455/67.1; 455/572; 455/423; 455/556; 455/456
[58] Field of Search ..................................... 455/423–425, 455/466, 67.1, 556, 557, 456, 457

[56] References Cited

U.S. PATENT DOCUMENTS

| | | | |
|---|---|---|---|
| 4,730,187 | 3/1988 | Menich et al. ......................... | 340/825.5 |
| 4,890,332 | 12/1989 | Takahashi ................................. | 455/67 |
| 5,001,776 | 3/1991 | Clark ........................................ | 455/226 |
| 5,146,609 | 9/1992 | Tayloe et al. ............................ | 455/33.2 |
| 5,428,671 | 6/1995 | Dykes et al. ............................. | 379/93 |
| 5,515,419 | 5/1996 | Sheffer ...................................... | 379/58 |
| 5,533,029 | 7/1996 | Gardner ................................... | 370/94.1 |
| 5,535,242 | 7/1996 | Brigida et al. ........................... | 375/222 |
| 5,561,838 | 10/1996 | Chandos et al. ........................ | 455/13.1 |
| 5,697,056 | 12/1997 | Tayloe ...................................... | 455/33.2 |
| 5,790,952 | 8/1998 | Seaholtz et al. ........................ | 455/432 |
| 5,799,256 | 8/1998 | Pombo et al. ........................... | 455/574 |
| 5,822,682 | 10/1998 | Schoderus et al. ....................... | 455/63 |
| 5,828,962 | 10/1998 | Ho-A-Chuck ............................ | 455/446 |
| 5,862,475 | 1/1999 | Zicker et al. ............................ | 455/419 |
| 5,887,259 | 3/1999 | Zicker et al. ............................. | 455/434 |
| 5,918,171 | 6/1999 | Funke et al. ............................. | 455/403 |

*Primary Examiner*—David R. Hudspeth
*Assistant Examiner*—Vijay B. Chawan
*Attorney, Agent, or Firm*—Banner & Witcoff, Ltd.

[57] ABSTRACT

During the CDPD mode period, RSSI data and battery capacity remaining determination data measured by a hand held phone HHP are periodically transferred to a personal computer PC, and are displayed on an LCD display of the personal computer PC. During the CDPD mode period, status data representing the operation state of the personal computer PC is transferred to and displayed on the hand held phone HHP. Furthermore, during the CSCD mode period, status data representing the operation state of the hand held phone HHP is transferred to the personal computer PC, and is displayed on the LCD display of the personal computer PC.

24 Claims, 22 Drawing Sheets

PERSONAL COMPUTER DISPLAY SCREEN
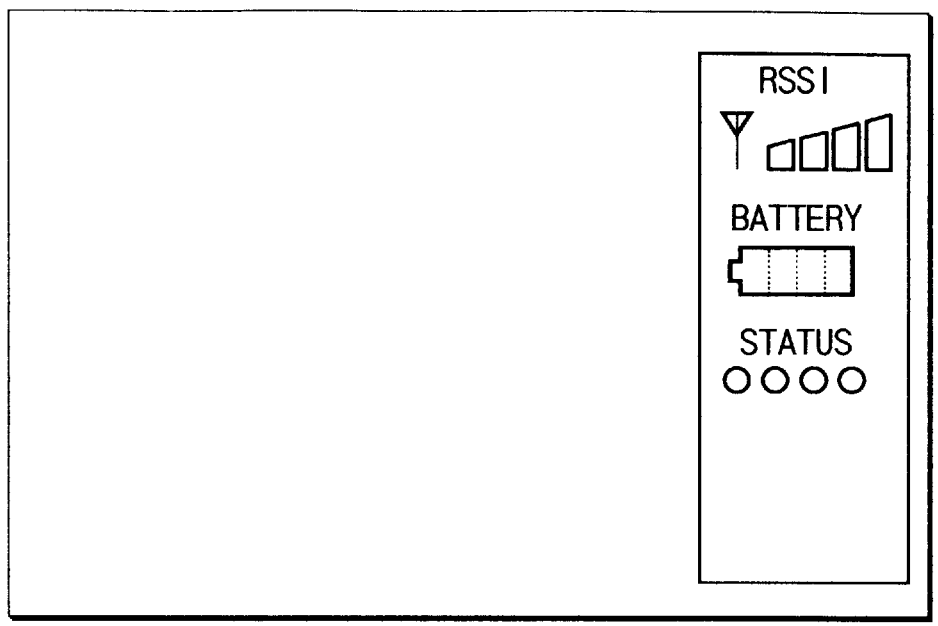
FIG. 17
FIG. 18A { LESS THAN −106 dBm 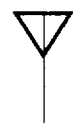
FIG. 18B { −106～−99 dBm 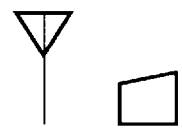
FIG. 18C { −100～−93 dBm 
FIG. 18D { −94～−87 dBm 
FIG. 18E { −88 dBm OR HIGHER 

| BATTERY VOLTAGE | STATE | L7 | L8 | L9 |
|---|---|---|---|---|
| 4.8V OR HIGHER | FULLY CHARGED | 1 | 0 | 1 |
| 4.8~4.6V | NORMAL CONVERSATION ALLOWED | 0 | 0 | 1 |
| 4.6~4.4V | SHORT-TIME CONVERSATION ALLOWED | 1 | 1 | 0 |
| 4.4~4.2V | CHARGING REQUIRED | 0 | 1 | 0 |
| LESS THAN 4.2V | DISCHARGE END | 1 | 0 | 0 |

HHP STATUS CHANGE REPORT

L6 : INCOMING CALL
L5 : CALL DISCONNECTION
L4 : SYSTEM ACCESS ERROR
L3 : SUCCESSFUL CONNECTION
L2 : CALL INTERRUPT
L1 : HAND-OFF START
L0 : HAND-OFF END

FIG. 22A    LEVEL 4    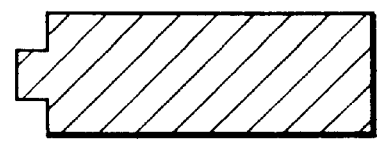
FIG. 22B    LEVEL 3    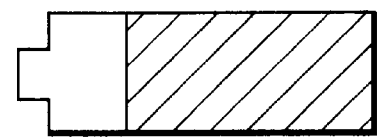
FIG. 22C    LEVEL 2    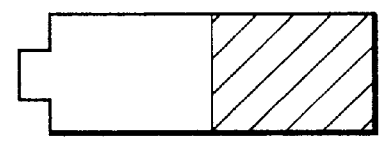
FIG. 22D    LEVEL 1    
FIG. 22E    DISCHARGE    
(FLICKERING)

MODEM CONNECTION STATUS

| MODEM STATUS | M0 | M1 | M2 |
|---|---|---|---|
| SEARCHING | 1 | 0 | 0 |
| NO SIGNAL | 0 | 1 | 0 |
| NO SERVICE | 1 | 1 | 0 |
| ACTIVE | 0 | 0 | 1 |
| SLEEPING | 1 | 0 | 1 |
| CHNG CHAN | 0 | 1 | 1 |
| (Blank) | 1 | 1 | 1 |
|  | 0 | 0 | 0 |

M0=0, M1=0, M2=0 ARE RESERVED

FIG. 23

CONTROL DATA TRANSFER RATE BETWEEN MU AND HHP

| DATA RATE | A0 | A1 | A2 |
|---|---|---|---|
| 9.6K | 0 | 0 | 0 |
| 14.4K | 1 | 0 | 0 |
| 19.2K | 0 | 1 | 0 |
| 38.4K | 1 | 1 | 0 |
| 57.6K | 0 | 0 | 1 |
| 76.8K | 1 | 0 | 1 |

FIG. 24

MOBILE COMMUNICATION TERMINAL APPARATUS WITH DATA COMMUNICATION FUNCTION

BACKGROUND OF THE INVENTION

The present invention relates to a mobile communication terminal apparatus which makes data communications using a cellular mobile communication network system with a CDPD (cellular digital packet data) service function.

As one of the communication services provided in the cellular mobile communication network system, a CDPD service is known. In the CDPD service, a base station or cell site for CDPD is equipped in addition to a base station for an existing cellular mobile communication network system such as AMPS (advanced mobile phone service system), and a data communication terminal such as a personal computer is used. An idle channel is searched from radio channels for voice communications, and is assigned as a data communication channel to a mobile station that requests data communications, thus allowing mobile data communications. Upon using radio voice channels, voice communications have priority. More specifically, when an arbitrary radio voice channel is used in data communications, if another mobile station attempts to start voice communications using that radio voice channel, the CDPD base station and the mobile station release the radio voice channel in use. Then, another unused radio voice channel is searched for, and mobile data communications are continued using the found radio voice channel.

The CDPD function has the following features.

(1) The RF resources of the existing cellular mobile communication system, and the station office, antenna, and approach line of the base station can be commonly used, resulting in low cost.

(2) Seamless communications can be provided by performing channel switching and roaming during communications.

(3) The CDPD supports TCP/IP (transmission control protocol/inter-net protocol) as the host protocol in computer network communications, and can provide a connection-less service without requiring any call connection processing.

(4) A single mobile station can attain both voice and data communications.

FIGS. 26 shows the schematic arrangement of a cellular mobile communication network system with the CDPD service function. This system comprises a plurality of mobile data intermediate stations DIS1, DIS2, . . . connected to intermediate stations IS of a cable network, and makes up sub-networks in units of mobile data intermediate stations DIS1, DIS2, . . . . Each sub-network corresponding to, for example, the mobile data intermediate station DIS1, is built by data communication base stations or cell sites DBS11, DBS12, . . . respectively set in cells E11, E12, . . . , and a plurality of data communication mobile stations DMS11, DMS12, . . . connected to these data communication base stations DBS11, DBS12, . . . via radio channels.

The mobile data intermediate stations DIS1, DIS2, . . . exchange data between the plurality of data communication base stations DBS11, DBS12, . . . accommodated in the own stations, and a fixed communication system or a fixed terminal FS accommodated in another CDPD system, via the intermediate stations IS. One of the intermediate stations IS has, for example, authentication, charging, network control functions, and the like.

The CDPD protocol has the following hierarchical structure. FIG. 27 shows that structure. Referring to FIG. 27, the data communication mobile stations DMS1, DMS2, . . . and the data communication base stations DBS1, DBS2, . . . are connected via the physical layer and the MAC layer. The MAC layer defines data transparency, frame encapsulation and error detection/correction functionality such as frame synchronization, radio access collision control (DSMA-CD: slotted non-persistent digital sense multiple access with collision detection), timing control based on synchronous words, and the like.

The data communication mobile stations DMS1 and DMS2, . . . and the mobile data intermediate station DIS are connected via the MDLP (mobile data link protocol) layer and the SNDCP (sub network dependent convergence protocol) layer. The MDLP layer corresponds to link control unique to CDPD, and defines a sleep mode for battery saving of hand held phones. The SNDCP layer provides a function of absorbing differences between the IP or CLNP layer corresponding to the network layer of the fixed terminal FS connected to a cable network NW, and the above-mentioned MDLP layer. The SNDCP layer multiplexes or distributes data from different SAPs (service access points) and compresses/expands a long protocol header of the network layer to improve the use efficiency of radio channels.

Each of the data communication mobile stations DMS1, DMS2, . . . comprises a hand held phone HHP, a personal computer PC, and a modem unit MU connecting the hand held phone HHP and the personal computer PC. Note that reference symbol CC denotes a curl cord for connecting the modem unit MU and the hand held phone HHP.

The personal computer PC has the control function on the mobile station side for CDPD communications. That is, when a CDPD mode is set, the personal computer PC connects the hand held phone HHP and one of the data communication base stations DBS1, DBS2, . . . via a radio channel in accordance with a predetermined CDPD protocol, and thereafter, performs data transmission control. At that time, the modem unit MU performs various interfacing operations required for radio-transmission data transmitted by the personal computer PC via the hand held phone HHP.

However, in the conventional data communication mobile station, measurement data such as received signal strength information (RSSI: Received Signal Strength Indicator) and the like obtained by the hand held phone during setting of the CDPD mode are not displayed on the personal computer. For this reason, upon looking for a location where the radio wave reception state is good, the operator must operate the personal computer while observing the RSSI measurement data displayed on the display unit of the hand held phone. In contrast to this, when a CSCD (circuit switched cellular data) mode in which the hand held phone executes control associated with radio connections in place of the personal computer is set, status information of the personal computer is not displayed on the hand held phone at all. For this reason, the operator must perform operations for radio connections at the hand held phone while observing the display unit of the personal computer.

More specifically, in the conventional data communication mobile station, various kinds of control information generated by the hand held phone and personal computer are merely displayed on the hand held phone or personal computer as the generation source. For this reason, even in communications in the CDPD mode or in radio connections in the CSCD mode, the operator must operate while observing the display unit of the hand held phone or personal computer, resulting in poor operability.

BRIEF SUMMARY OF THE INVENTION

It is the first object of the present invention to provide a mobile communication terminal apparatus which can provide information necessary for the user at one, operated by the user, of a hand held phone and a data terminal device, thereby improving operability.

It is the second object of the present invention to provide a mobile communication terminal apparatus which can easily attain command accept/exchange between a hand held phone and a data terminal device.

It is the third object of the present invention to provide a hand held phone which can reliably turn off the power supply of the hand held phone without causing any trouble in mobile data communications when power is turned off at the hand held phone during mobile data communications.

It is the fourth object of the present invention to provide a mobile communication terminal apparatus which can realize urgent control at high speed without arranging a large number of signal lines, when the data terminal device controls the operation state of a hand held phone by transferring control signals thereto.

It is the fifth object of the present invention to provide a mobile communication terminal apparatus which can attain both high-speed mobile data communication control and power savings.

In order to achieve the first object, according to the first invention, in a mobile communication terminal apparatus comprising a hand held phone, and a data terminal device which comprises a control unit having a control function for performing mobile data communications based on a CDPD scheme via the hand held phone, and a modem unit for connecting the control unit and the hand held phone to perform an interface operation for mobile data communications under the control of the control unit, the hand held phone comprises received signal strength measurement means, and the data terminal device comprises reception quality display control means. While a mode for the mobile data communications is set, the received signal strength measurement means measures the received signal strength of an RF channel which is being received, and transfers the measurement data to the data terminal device. At the same time, the reception quality display control means generates information representing reception quality on the basis of the received signal strength measurement data transferred from the hand held phone, and displays the information on the control unit.

According to this invention, while the mobile data communication mode is set, the measurement data of the received signal strength measured by the hand held phone is automatically transferred to the data terminal device, and is displayed on the control unit comprising, e.g., a personal computer. For this reason, the operator can recognize the reception state of radio waves at the hand held phone on the basis of the received signal strength information displayed on the display while performing operations for mobile data communications at the data terminal device. Hence, the operator need not observe the display unit of the hand held phone to check the radio wave reception state, thus improving operability.

In general, in CDPD communications, the operator often puts a hand held phone near the window where the radio wave reception state is relatively good, and sets a personal computer connected to the hand held phone via, e.g., a cord, on his or her own desk to operate it. In such a state, in the prior art that displays the received signal strength information on only the display unit of the hand held phone, the operator must leave his or her seat and go to the window to see the display unit of the hand held phone. However, in this invention, since the received signal strength information is automatically transferred from the hand held phone to the personal computer, and is displayed on the display unit of the personal computer, the operator need not leave his or her seat, and can check the radio wave reception state at the hand held phone while operating the personal computer.

According to the second invention, in an apparatus which has a communication mode like a CSCD mode in which a hand held phone leads connection control between a data terminal device and a base station upon executing mobile data communications, the hand held phone comprises status information transfer means, and the data terminal device comprises status information display control means. While the communication mode in which the hand held phone leads connection control with the base station is set, the hand held phone transfers status information representing its own operation state in that communication mode to the data terminal device using the status information transfer means, and the data terminal device displays the status information transferred from the hand held phone on a control unit using the status information display control means.

Therefore, according to this invention, while the CSCD mode is set, the status information representing the operation state of the hand held phone is transferred from the hand held phone to the data terminal device, and is displayed on the control unit. For this reason, the operator can check the state of the connection control at the hand held phone on the basis of the status information displayed on the display unit of the data terminal device while performing operations for mobile data transmission without observing the display unit of the hand held phone, like in the received signal strength. Therefore, the operability for the operator can be improved.

Furthermore, according to the third invention, in an apparatus which has a communication mode in which a data terminal device leads connection control between a hand held phone and a base station upon executing mobile data communications, the data terminal device comprises status information transfer means, and the hand held phone comprises status information display control means. While the communication mode in which the data terminal device leads connection control with the base station is set, the data terminal device transfers status information representing its own operation state to the hand held phone using the status information transfer means, and the hand held phone displays the status information transferred from the data terminal device on its display unit using the status information display control means.

Therefore, according to this invention, in the CDPD mode, since the status information representing the operation state of the data terminal device is transferred to the hand held phone, and is displayed on the display unit of the hand held phone, even while, for example, the operator adjusts the setting position of the hand held phone near the window, he or she can check the state of the connection state at the data terminal device.

Moreover, according to the fourth invention, the hand held phone comprises means for monitoring the state of a battery, and the data terminal device comprises battery information display control means. While the hand held phone is battery-driven, the remaining capacity of the battery is monitored by the battery monitoring means, and the monitoring data is transferred to the data terminal device. In the data terminal device, the battery information display control means generates information representing the battery remaining capacity on the basis of the monitoring data of the battery remaining capacity transferred from the hand held phone, and displays the information on a control unit.

Therefore, according to this invention, the battery remaining capacity of the hand held phone is transferred to the data terminal device, and is displayed on the control unit. For this reason, the operator can check the remaining capacity of the battery of the hand held phone by observing the display unit of the data terminal device while performing operations for mobile data transmission at the data terminal device without observing the display unit of the hand held phone.

In order to achieve the second object, according to the fifth invention, when a request command associated with mobile data communications is sent from a data terminal device to a hand held phone, the hand held phone directly sends back the request command as a reception confirmation command to the data terminal device. The data terminal device transmits the request command to the hand held phone, and thereafter, checks if the same request command as the transmitted request command is sent back from the hand held phone, and performs reception confirmation of the transmitted request command at the hand held phone on the basis of the checking result.

In this manner, as compared to a case wherein an exclusive reception confirmation command is generated and sent back, reception confirmation of the command can be performed more easily, and the command exchange control procedure between the hand held phone and the data terminal device can be simplified.

In order to achieve the third object, according to the sixth invention, in a hand held phone which is connected to a data terminal device with a predetermined communication control function required for performing mobile data communications, and has a function of modulating transmission data from the data terminal device, transmitting the modulated data to a base station via a radio channel, receiving a radio carrier wave signal coming from the base station via the radio channel, demodulating the signal to reception data, and transferring the reception data to the data terminal device, when an operation for turning off a power supply of the hand held phone is performed while a mode for the mobile data communications is set, a power-OFF request is output to the data terminal device, when a power-OFF instruction is sent back from the data terminal device after the power-OFF request is output, the power supply of the hand held phone is turned off, when a power-ON instruction is sent back, the power supply of the hand held phone is kept ON, and when neither the power-OFF instruction nor power-ON instruction are sent back within a predetermined period of time after the power-OFF request is output to the data terminal device, the power supply of the hand held phone is turned off.

With this hand held phone, even when the power-OFF operation is performed at the hand held phone during mobile data communications, the hand held phone sends an inquiry (power-OFF request) to the data terminal device. In response to this inquiry, when the data terminal device sends permission (power-OFF instruction), the power supply of the hand held phone is turned off. On the other hand, when the data terminal device sends a power-ON instruction, the operation state of the hand held phone is maintained. For this reason, the hand held phone can be turned off after, for example, the data transmission end procedure or radio channel release procedure is reliably ended, and adverse influences on the data transmission operation and radio connection operation can be eliminated.

Also, when no permission is sent back a predetermined period of time after the inquiry was output to the data terminal device, the hand held phone is automatically turned off. For this reason, even when the power-OFF instruction is sent back from the data terminal device to the hand held phone due to runaway of a CPU of the data terminal device or trouble at an interface, the hand held phone can be reliably turned off. Hence, wasteful power consumption at the hand held phone can be reduced, and the battery life can be prolonged.

In order to achieve the fourth object, according to the seventh invention, while a communication mode (CDPD mode) in which a data terminal device leads connection control between a hand held phone and a base station is set, a control signal for controlling a predetermined operation state of the hand held phone is directly transferred from the data transfer apparatus to the hand held phone via a dedicated control signal line, and other control signals are transferred via a signal transmission path with a bus architecture.

Accordingly, as for urgent operation control like in a case wherein a transmission power amplifier is turned on under the control of a data terminal device, since a control signal for this purpose is transferred via a dedicated signal line, high-speed control is realized and, hence, CDPD data transmission efficiency can be improved. In this connection, when the control signal for turning on the transmission power amplifier is transferred via a bus, since an operation delay is produced from when a personal computer PC outputs the control signal until the transmission power amplifier is turned on, the personal computer PC must delay the transmission start timing of CDPD data by a time corresponding to the operation delay. For this reason, extra time is required for transmitting CDPD data, resulting in higher communication cost.

The dedicated signal line is not arranged for all the control data or control signals, but control signals associated with less urgent operation control are transferred by commonly using a signal transmission path with a bus architecture. For this reason, as compared to a case wherein dedicated signal lines are arranged in units of control lines, the number of signal lines can be greatly reduced, and a size reduction of the apparatus can be realized.

In order to achieve the fifth object, according to the eighth invention, the control data transfer rate between the data terminal device and the hand held phone is set at a predetermined first rate when a mobile data communication execution mode is set, and is set at a second rate lower than the first rate when a mobile data communication standby mode is set.

According to this invention, in the CDPD standby mode, consumption power can be reduced to extend the battery life. On the other hand, in the CDPD data transmission mode, control associated with the transmission can be attained at high speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 17 is a plan view showing the display positions of RSSI information, battery remaining capacity information, and status data on the display of the personal computer PC;

FIGS. 18A to 18E show display examples of RSSI information on the personal computer PC;

FIGS. 22A to 22E show display examples of the battery remaining capacity on the personal computer PC;

FIG. 23 is a table showing the types of status data and their code formats exchanged between the hand held phone HHP and personal computer PC;

FIG. 24 is a table showing the types of control data transfer rates between the modem unit MU and the hand held phone HHP;

DETAILED DESCRIPTION OF THE INVENTION

Figure 1:
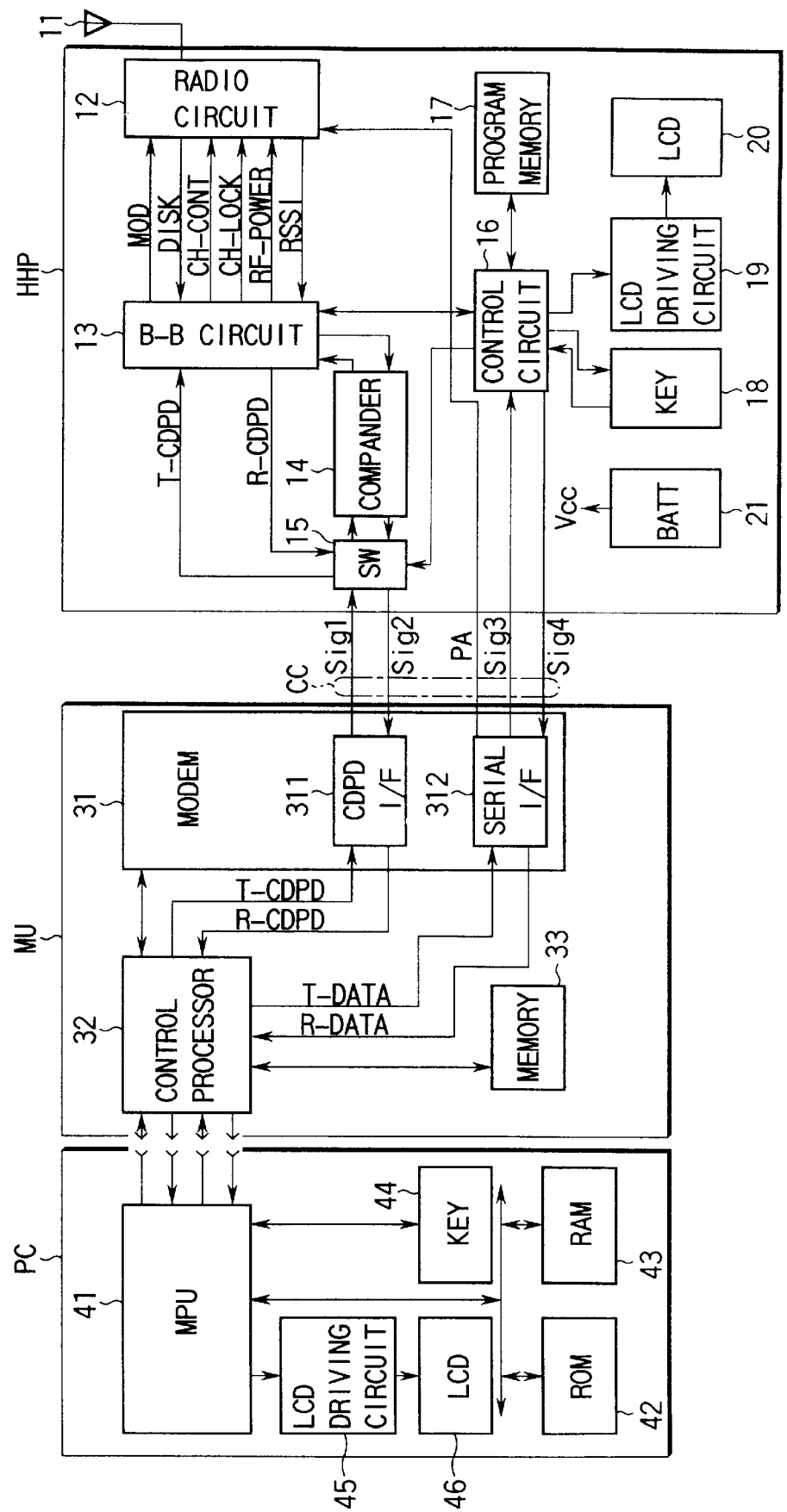
FIG. 1 is a block diagram showing an embodiment of a mobile communication terminal apparatus according to the present invention.

FIG. 1 is a block diagram showing an embodiment of a mobile communication terminal apparatus according to the present invention. The mobile communication terminal apparatus of this embodiment comprises a hand held phone HHP, a personal computer PC, and a modem unit MU which connects the hand held phone HHP and the personal computer PC to allow CDPD transmission therebetween. Note that reference symbol CC denotes a curl cord for connecting the modem unit MU and the hand held phone HHP.

Of these devices, the hand held phone HHP comprises a radio circuit 12 connected to an antenna 11, a baseband circuit (B—B circuit) 13 arranged in the form of an LSI, a signal processing circuit 14 that incorporates a compander and a bandpass filter, and a switch circuit (SW) 15. Of these circuits, the radio circuit 12 transmits/receives a radio signal to/from a base station (not shown) using an analog modulation/demodulation scheme. The baseband circuit 13 performs baseband signal processing such as compression/expansion processing and filtering processing for a transmission signal before modulation and a reception signal after demodulation, synthesis with a control signal, and the like, together with the signal processing circuit 14. The switch circuit 15 selects a signal route corresponding to the individual modes such as AMPS mode, CDPD mode, and the like under the control of a control circuit 16 (to be described below).

The hand held phone HHP also comprises the control circuit 16. The control circuit 16 systematically controls the operation of the hand held phone HHP in accordance with a control program and control data stored in a program memory 17. The control circuit 16 is connected to a key input unit (KEY) 18 and an LCD driving circuit 19. The key input unit 18 includes various function keys such as a call origination key, end key, mode selection key, and the like in addition to dial keys. The LCD driving circuit 19 displays display data supplied from the control circuit 16 on an LCD 20. Note that reference numeral 21 denotes a power supply circuit (BTT), which generates a desired operation voltage $V_{CC}$ on the basis of the output voltage from a battery, and supplies it to the respective circuits in the hand held phone HHP.

The modem unit MU comprises a modem 31 arranged in the form of an integrated circuit, a control processor 32, and a memory 33. The modem 31 comprises a CDPD interface 311 and a control serial interface 312.

The CDPD interface 311 performs transfer interfacing for exchanging a transmission signal Sig1 and reception signal Sig2 between the control processor 32 and the hand held phone HHP. The transmission signal Sig1 and reception signal Sig2 respectively become a transmission audio signal (T-Audio) and reception audio signal (R-Audio) in the AMPS mode, and also become CDPD transmission data (T-CDPD) and CDPD reception data (R-CDPD) in the CDPD mode. The control serial interface 312 performs transfer interfacing for exchanging transmission control data Sig3 and reception control data Sig4 between the control processor 32 and the hand held phone HHP. The control processor 32 performs control for CDPD communications in accordance with program and control data stored in the memory 33.

The personal computer PC comprises a microprocessor (MPU) 41, a ROM 42 that stores a program and data required for the operation of the microprocessor 41, a RAM 43 for storing an application program and data of the user, a keyboard (KEY) 44, an LCD display 46, and an LCD driving circuit 45 for displaying display data output from the microprocessor 41 on the LCD display 46.

The microprocessor 41 has a control function required for performing CDPD communications in addition to various data processing functions. Especially, as functions according to the present invention, the microprocessor 41 has a function of displaying RSSI information transferred from the hand held phone HHP on the LCD display 46 in the CDPD mode, a function of displaying battery remaining capacity discrimination data transferred from the hand held phone HHP on the LCD display 46, a status transfer control function of transferring status information representing the operation state of the personal computer PC to the hand held phone HHP and controlling the hand held phone HHP to display it in the CDPD mode, and a status display control function of displaying status information representing the operation state of the hand held phone HHP transferred from the hand held phone HHP on the LCD display 46 in a CSCD mode.

Figure 2:
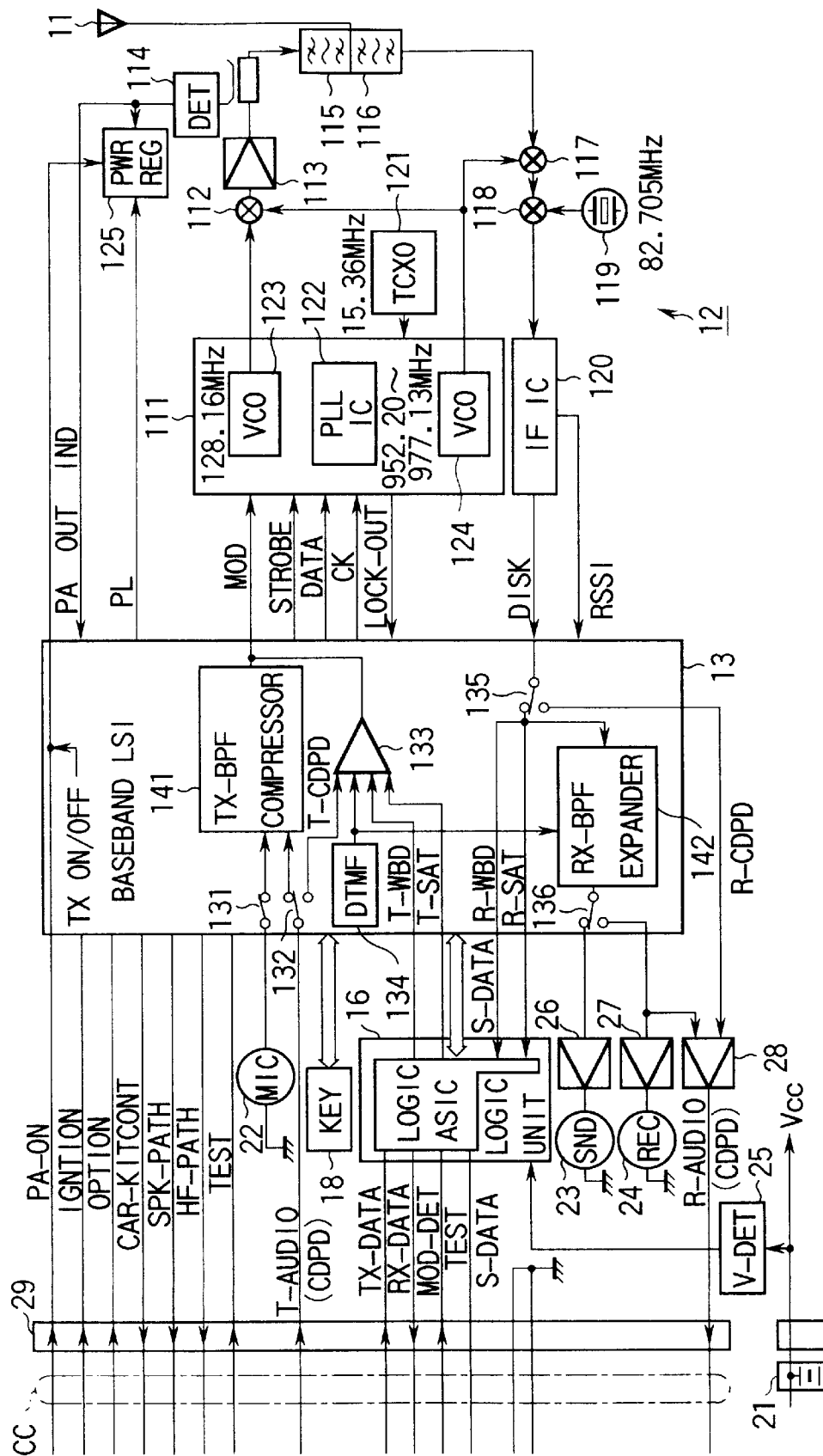
FIG. 2 is a block diagram showing the arrangement of a hand held phone HHP in the mobile communication terminal apparatus shown in FIG. 1.

FIG. 2 is a block diagram showing the arrangement of the hand held phone HHP of the above-mentioned units in more detail. In FIG. 2, when the AMPS mode is set, an outgoing speech signal input from a microphone 22 is input to a transmission signal processor 141 via a switch 131. In the transmission signal processor 141, the outgoing speech signal is filtered by a bandpass filter, and is compressed by a compressor to be converted into a modulated signal (MOD). The modulated signal is input to a modulation circuit 111. Note that a control signal generated by the control circuit 16 during, e.g., a connection control procedure, and a DTMF signal generated by a DTMF oscillator 134 are synthesized by a signal synthesizing circuit 133, and the synthesized signal is input to the modulation circuit 111 in place of the outgoing speech signal or after it is superposed on the outgoing speech signal.

In the modulation circuit 111, a voltage controlled oscillator (VCO) 123 generates an IF signal corresponding to the outgoing speech signal or control signal. That is, analog modulation such as FM modulation or the like is performed. The modulated wave signal output from the modulation circuit 111 is mixed with a transmission local oscillation signal by a mixer 112 to be frequency-converted into a radio channel frequency, and thereafter, the signal is amplified to a predetermined transmission level by a transmission power amplifier 113. Furthermore, the frequency band of the amplified signal is limited by a bandpass filter 115, and the signal is then transmitted from the antenna 11 toward the base station (not shown). Note that the transmission local oscillation signal is generated by a synthesizer arranged in the modulation circuit 111, i.e., a PLL circuit 122 and a voltage controlled oscillator (VCO) 124 arranged in the form of an IC.

In contrast to this, an RF signal coming from the base station in the AMPS mode is received by the antenna 11, and is input in turn to mixers 117 and 118 via a reception bandpass filter 116. The RF signal is sequentially mixed with a first reception local oscillation signal generated by the VCO 124 and a second reception local oscillation signal generated by a fixed oscillator 119 by these mixers to be frequency-converted into a second IF signal. An IF circuit (IFIC) 120 arranged as an IC has an analog demodulator such as a discriminator in addition to an IF filter and an IF amplifier. With these circuits, the second reception IF signal is demodulated.

In the baseband circuit 13, a demodulation control signal input from the IF circuit 120 during a circuit connection procedure is input to the control circuit 16 via a switch 135. Also, a demodulated incoming speech signal input from the IF circuit 120 during voice communications is input to a reception signal processor 142 via the switch 135. In the reception signal processor 142, the demodulated incoming speech signal is filtered by a bandpass filter, and is expanded by an expander. The reconstructed incoming speech signal is input to a receive amplifier 26 via a switch 136, and is amplified. The amplified signal is then output as a voice from a loudspeaker (SND) 23. When an automatic-answering mode is set, the incoming speech signal is input to a record amplifier 27 via the switch 136, and is amplified. Thereafter, the amplified signal is supplied to a recording circuit (REC) 24, and is recorded.

When the CDPD mode is set, CDPD transmission data output from the personal computer PC (Not shown) is input to the baseband circuit 13 of the hand held phone HHP via the modem unit MU. The CDPD transmission data is input to the signal synthesizing circuit 133 via a switch 132 in the baseband circuit 13, and is synthesized with other control signals such as a DTMF tone signal and the like. Thereafter, the synthesized signal is input to the modulation circuit 111. In the modulation circuit 111, analog modulation of a carrier wave signal is performed based on the CDPD data as in the AMPS mode, and the modulated wave signal is frequency-converted into a radio channel frequency. The converted signal is transmitted from the antenna 11 to the base station.

In contrast to this, an RF signal coming from the base station is frequency-converted into an IF signal as in the AMPS mode, and the IF signal is demodulated to CDPD reception data (DISK) by the IF circuit 120. The demodulated signal is input to the baseband circuit 13. In the CDPD mode, the switch 135 in the baseband circuit 13 is set at the modem unit MU side. Hence, the CDPD reception data output from the IF circuit 120 is amplified by a transfer amplifier 28 via the switch 135, and is transferred from a terminal 29 to the modem unit MU. Furthermore, the CDPD reception data is transferred from the modem unit MU to the personal computer PC.

The IF circuit 120 has a received signal strength detector. The received signal strength detector detects the received signal strength indicator (RSSI) of an RF signal on the basis of the amplitude level of the second reception IF signal. The detection value detected by the received signal strength detector is input to the baseband circuit 13 as an RSSI signal, and is converted into, e.g., a digital signal. The digital signal is then input to the control circuit 16.

Furthermore, the power supply circuit 21 includes a voltage detection circuit (V-DET) 25. The voltage detection circuit 25 compares a battery output voltage $V_{CC}$ of the power supply circuit 21 with the lowest operation-guaranteed voltage of the hand held phone HHP. When the battery output voltage $V_{CC}$ drops to a level equal to or lower than the lowest operation-guaranteed voltage, the voltage detection circuit 25 generates a low voltage detection signal, and supplies the detection signal to the interrupt terminal of the control circuit 16.

The control circuit 16 comprises a logic unit having storage media such as a ROM, RAM, EEPROM, and the like, an LCD driving circuit, and the like, and a logic gate array (ASIC) for exchanging control signals, in addition to a CPU. The control circuit 16 executes predetermined communication control in the individual p, modes such as AMPS, CDPD, CSCD, and the like.

This communication control includes RSSI notification control for transferring and displaying RSSI information onto the personal computer PC, battery capacity remaining notification control for determining the battery capacity remaining, and transferring and displaying the determination data onto the personal computer PC, status display control for receiving status information of the personal computer PC and the modem unit MU in the CDPD mode, and displaying the received information on the LCD 20, and status notification control for transferring and displaying status information representing the operation state of the hand held phone HHP onto the personal computer PC in the CSCD mode, as the characteristic features of the present invention.

In the CDPD mode, the modem unit MU and the hand held phone HHP exchange various control signals in addition to the above-mentioned CDPD data. The control signals include, for example, a power-ON/OFF control signal for ON/OFF-controlling the transmission power amplifier 113 of the hand held phone HHP, control data such as channel control data required for connection control and communication control, and the like.

Of these signals, control signals such as the power-ON/OFF control signal and the like, that must be transferred at once are directly transferred to the circuits to be controlled via dedicated signal lines arranged between the modem unit MU and the circuits to be controlled in the hand held phone HHP. For example, the power-ON/OFF control signal is directly transferred to a power supply circuit (PWR-REG) 125 in the hand held phone HHP via a signal line PA-ON.

In contrast to this, control data such as status display data and the like, that are less urgent are temporarily transferred from the modem unit MU to the control circuit 16 in the hand held phone HHP via a signal line TX-DATA, and they are then transferred from the control circuit 16 to the baseband circuit 13 via a data bus S-DATA. The baseband circuit 13 performs processing for converting the transmission control data into a signal format required for, e.g., radio transmission. The processed transmission control data are supplied to the radio circuit 12, and transmitted from the radio circuit 12 via the antenna 11.

Independently of the urgency of control signals and control data to be transferred, signal level conversion is required between the modem unit MU and the hand held phone HHP. This is because the modem unit MU uses a 5V type battery voltage, while the hand held phone HHP uses a 4V type battery voltage. For this reason, in this embodiment, signal level conversion circuits are arranged in the hand held phone HHP side in units of signal lines to perform level conversion of the control signals and control data.

Figure 3:
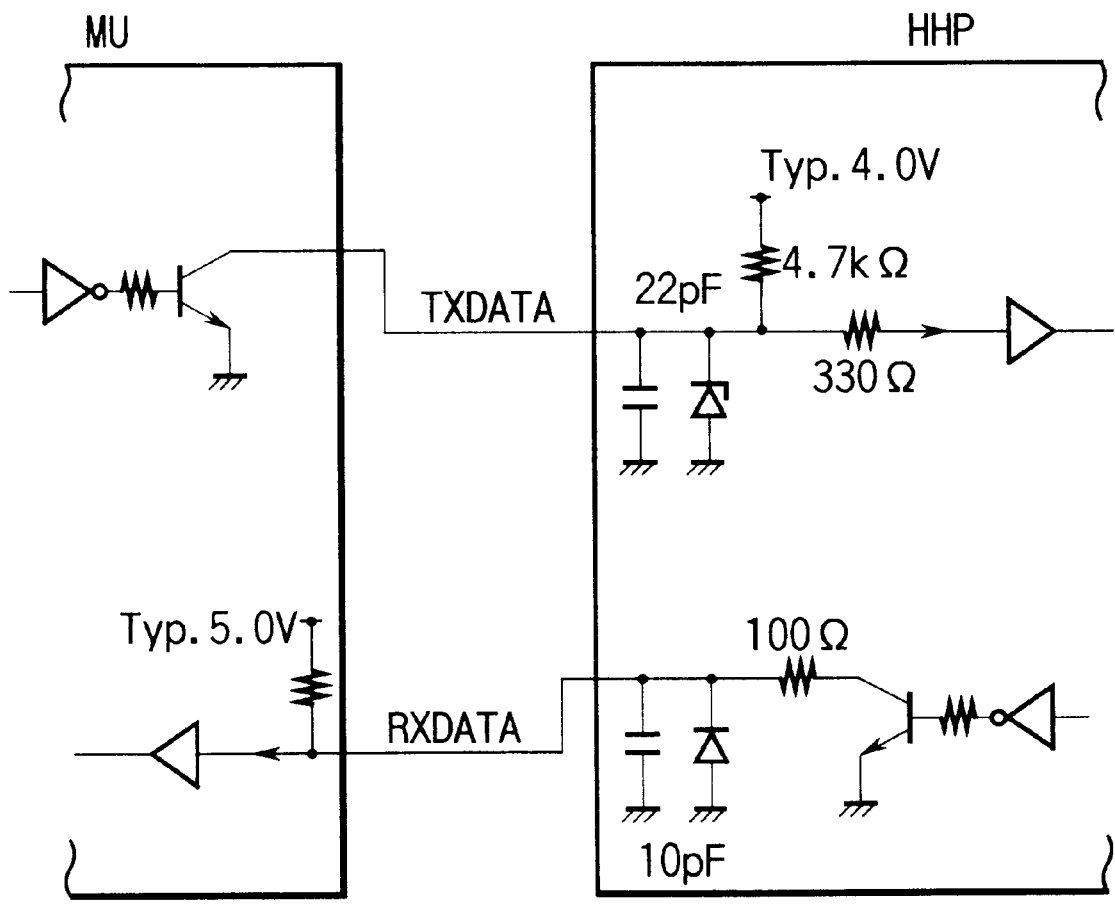
FIG. 3 is a circuit diagram showing the arrangement of a circuit for converting the signal level of control data transferred between a modem unit MU and the hand held phone HHP.
Figure 4:
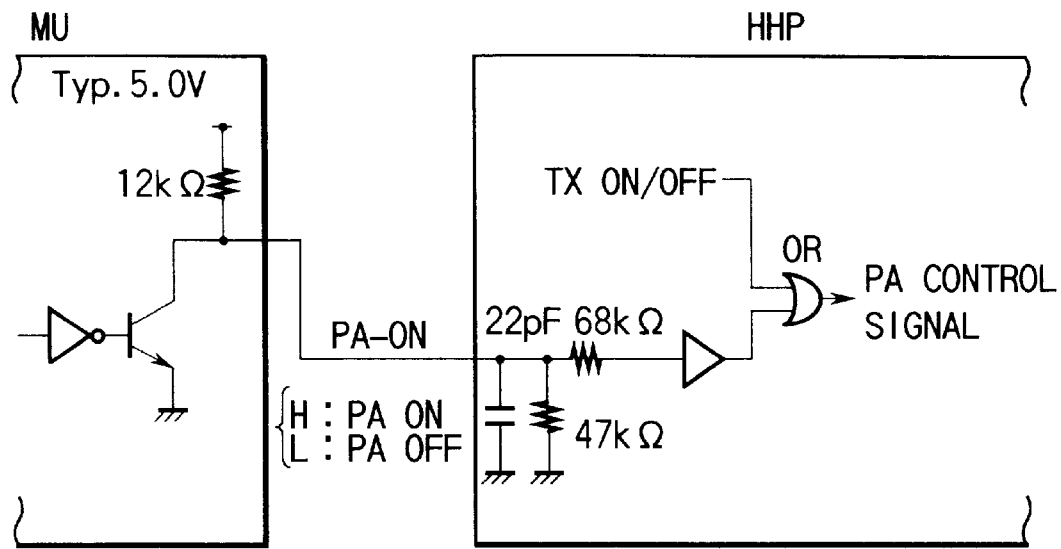
FIG. 4 is a circuit diagram showing the arrangement of a circuit for converting the signal level of a power-ON/OFF control signal transferred from the modem unit MU to the hand held phone HHP.
Figure 5:
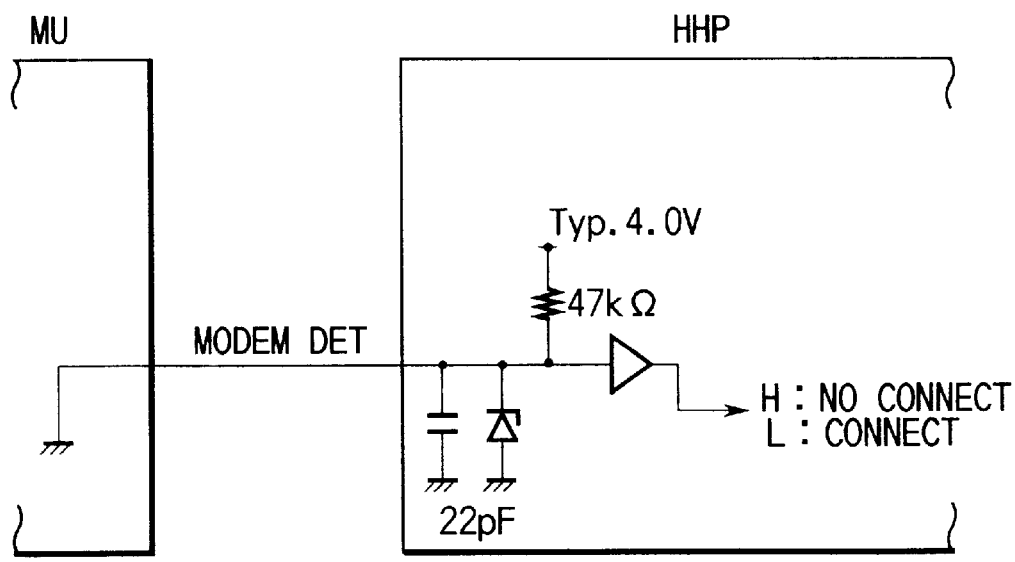
FIG. 5 is a circuit diagram showing the arrangement of a circuit for converting the signal level of a detection signal representing the presence/absence of connection of the modem unit MU.

For example, a signal level conversion circuit shown in FIG. 3 is used for signal lines TX-DATA and RX-DATA that transfer control data, and a signal level conversion circuit shown in FIG. 4 is used for the signal line PA-ON that transfers the power-ON/OFF control signal. Referring to FIG. 4, an OR gate OR logically ORs the power-ON/OFF control signal coming from the modem unit MU via the signal line PA-ON, and a transmission control signal TX ON/OFF generated by the baseband circuit 13 in the hand held phone HHP, and outputs the OR. Note that FIG. 5 shows the arrangement of a signal level conversion circuit for a signal line MOD-DET for detecting the presence/absence of connection of the modem unit MU.

Figure 6:
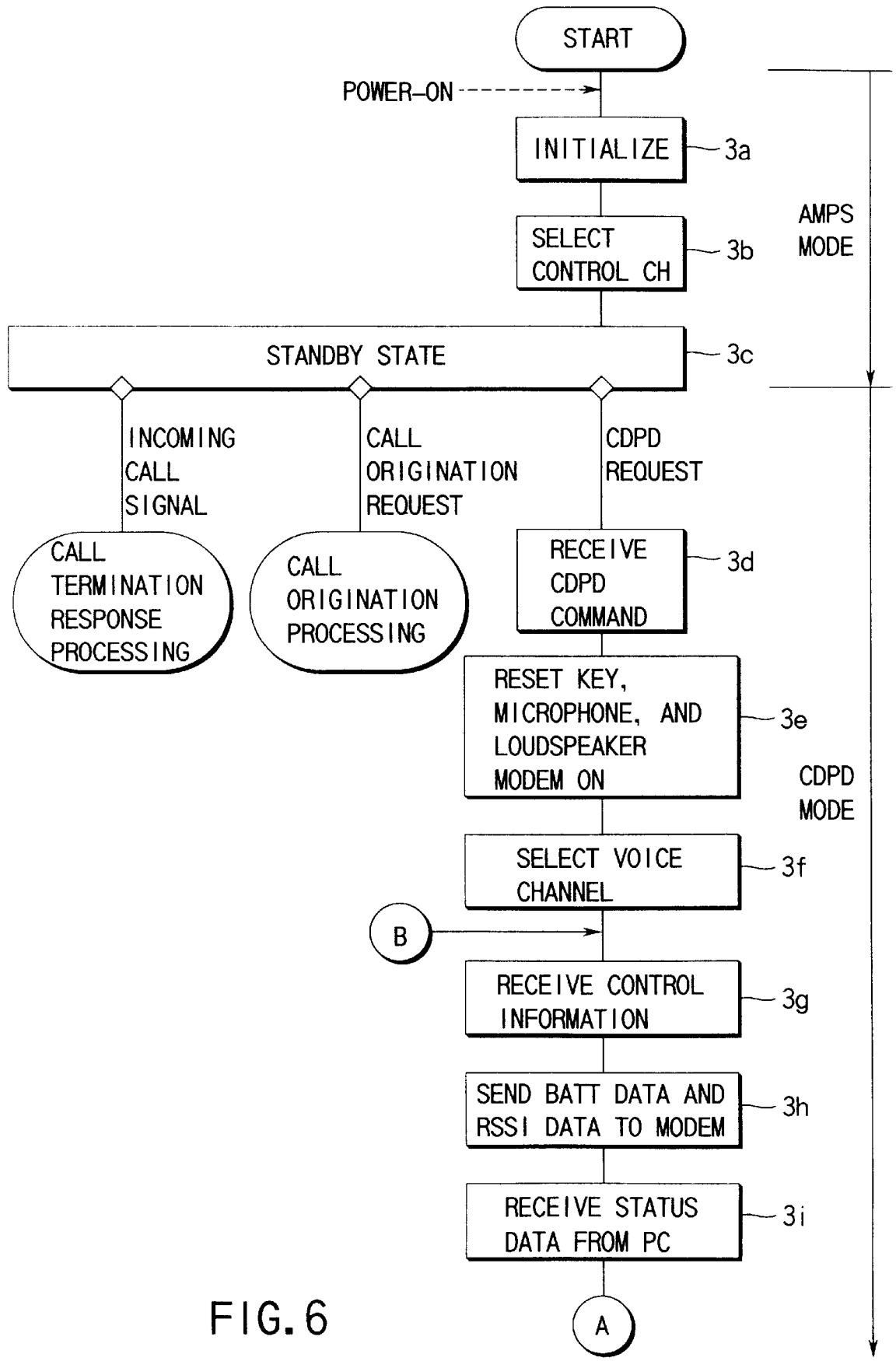
FIG. 6 is a flow chart showing the former half portion of the operation procedure of the hand held phone HHP.
Figure 7:
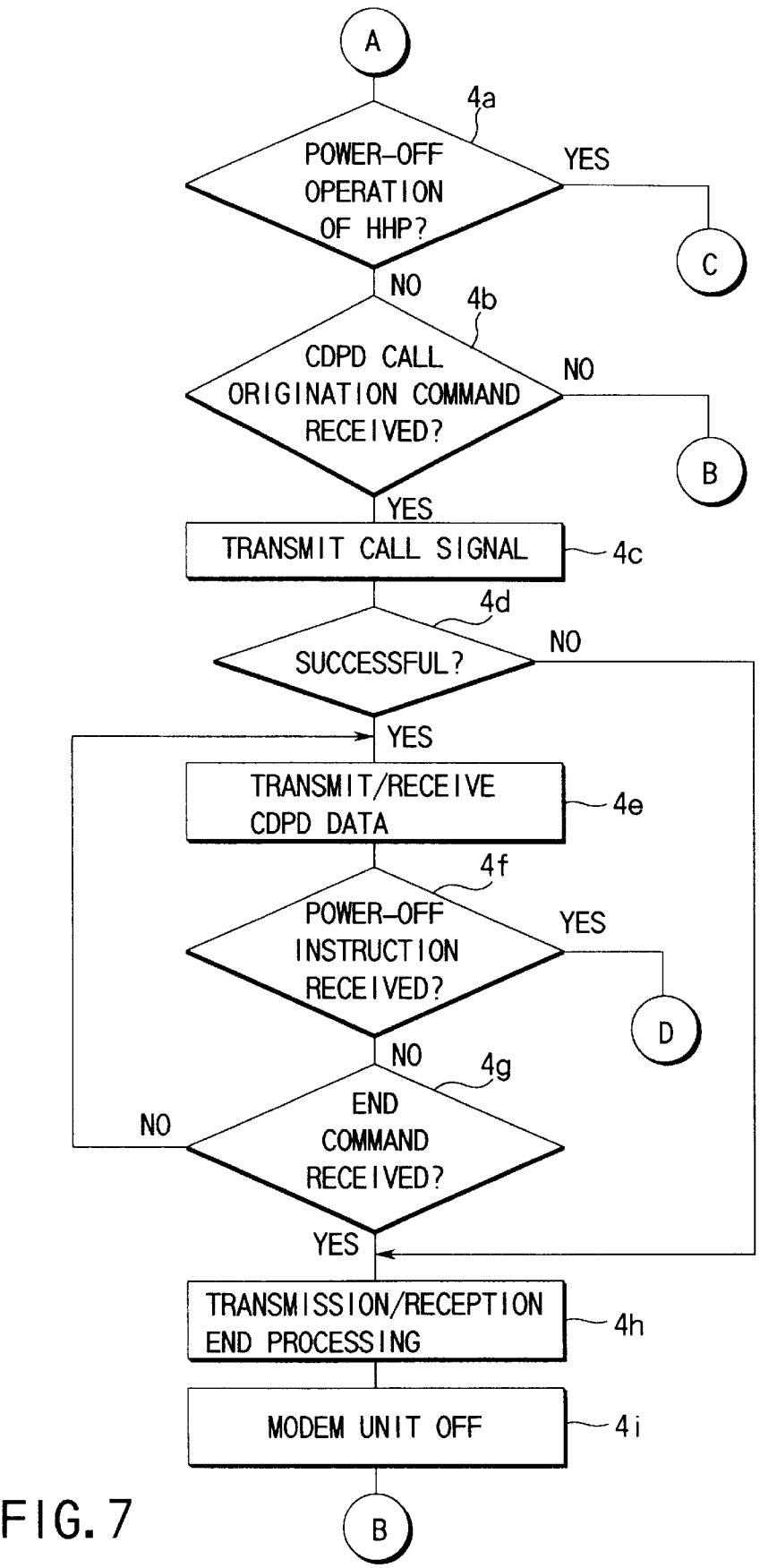
FIG. 7 is a flow chart showing the middle portion of the operation procedure of the hand held phone HHP.
Figure 8:
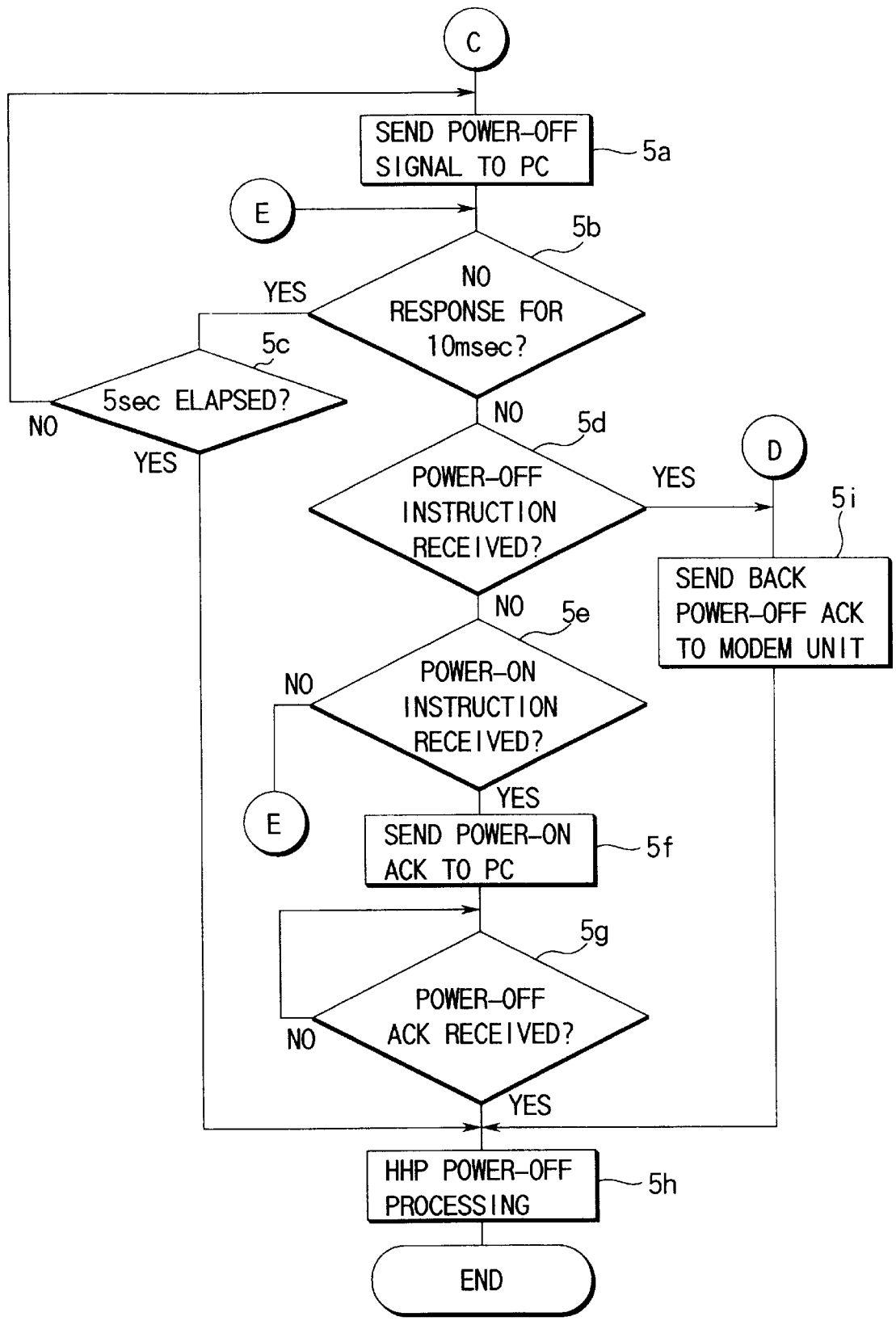
FIG. 8 is a flow chart showing the latter half portion of the operation procedure of the hand held phone HHP.
Figure 9:
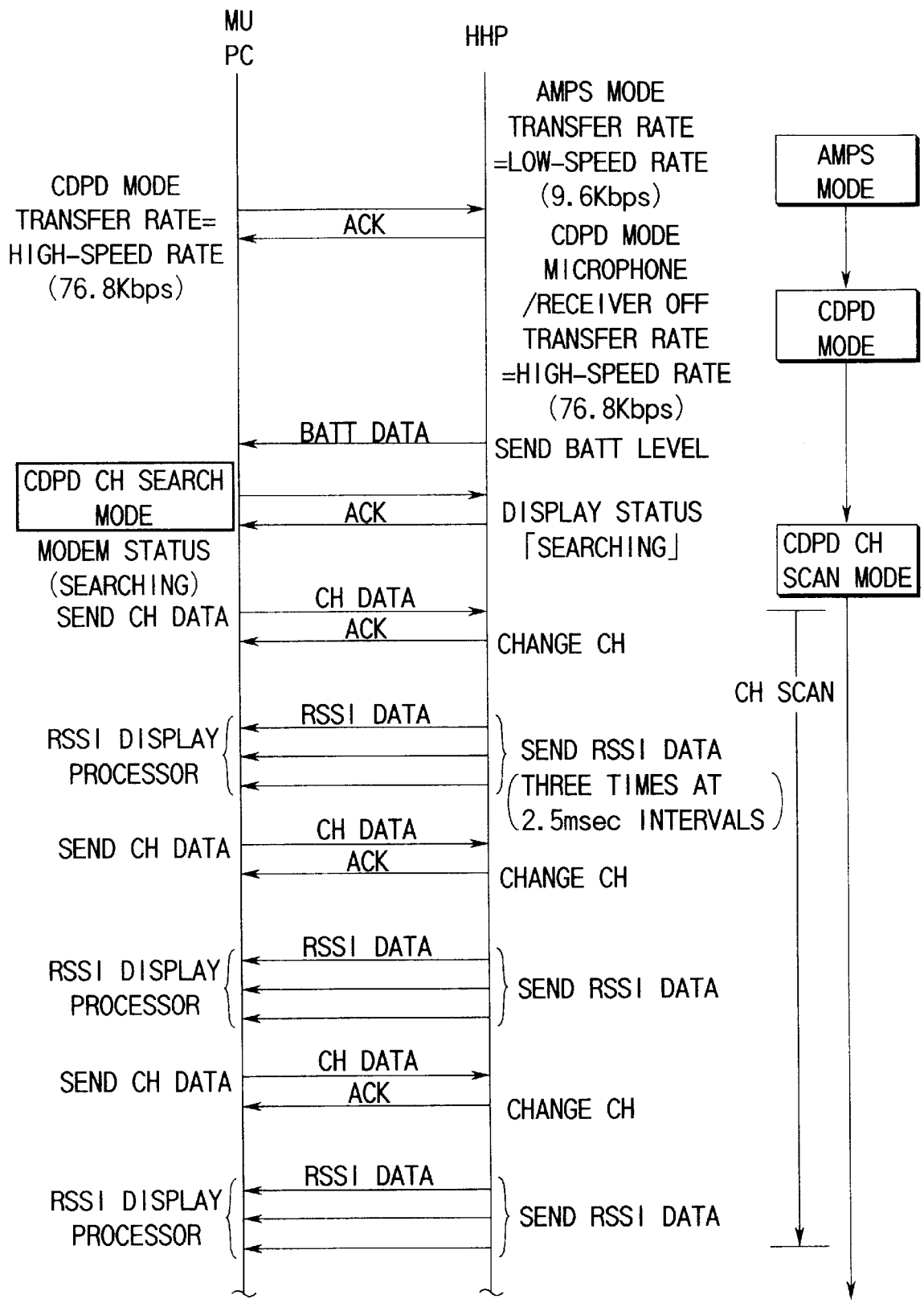
FIG. 9 is a sequence chart showing exchange of signals among the hand held phone HHP, modem unit MU, and personal computer PC.
Figure 10:
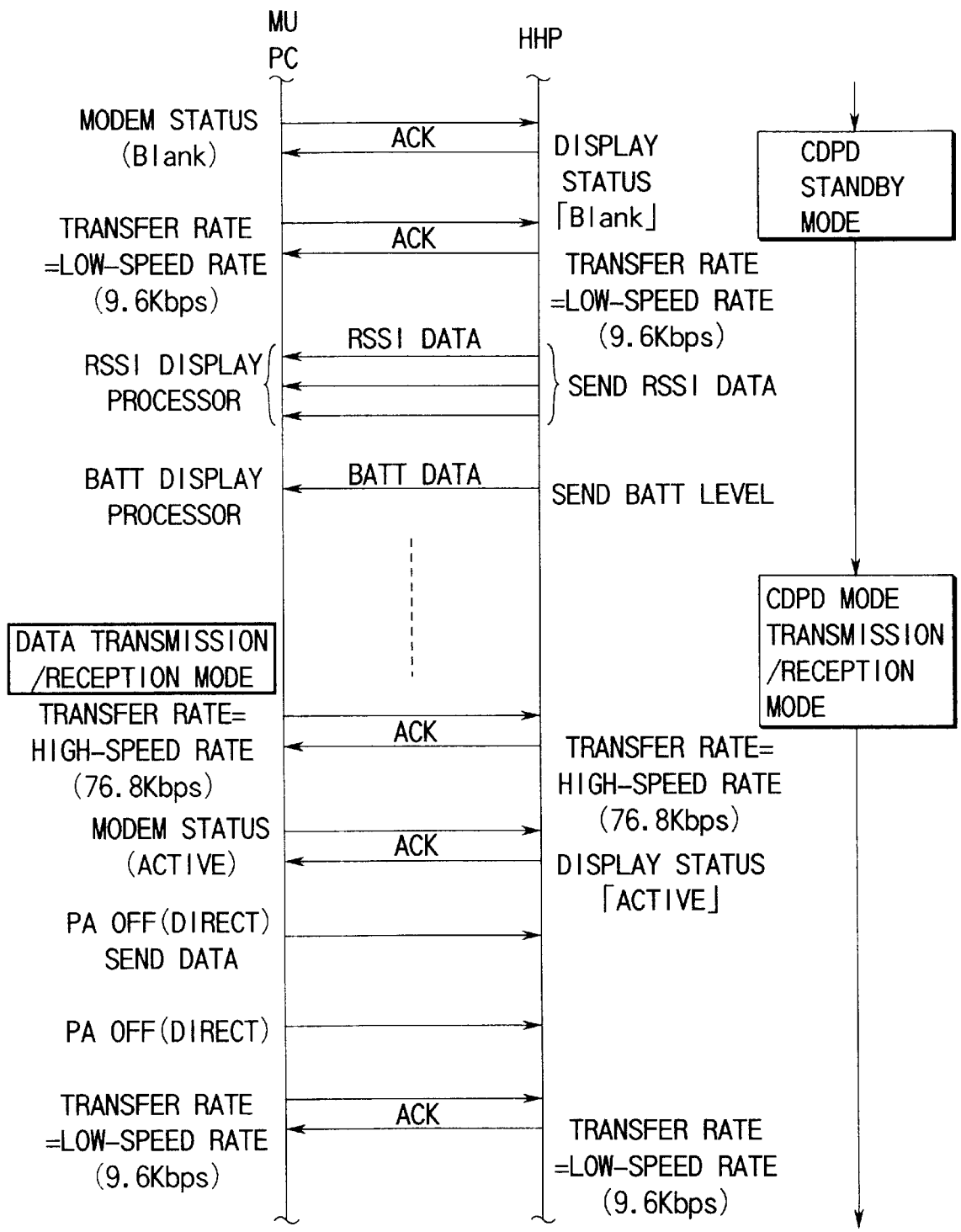
FIG. 10 is a sequence chart showing exchange of signals among the hand held phone HHP, modem unit MU, and personal computer PC.
Figure 11:
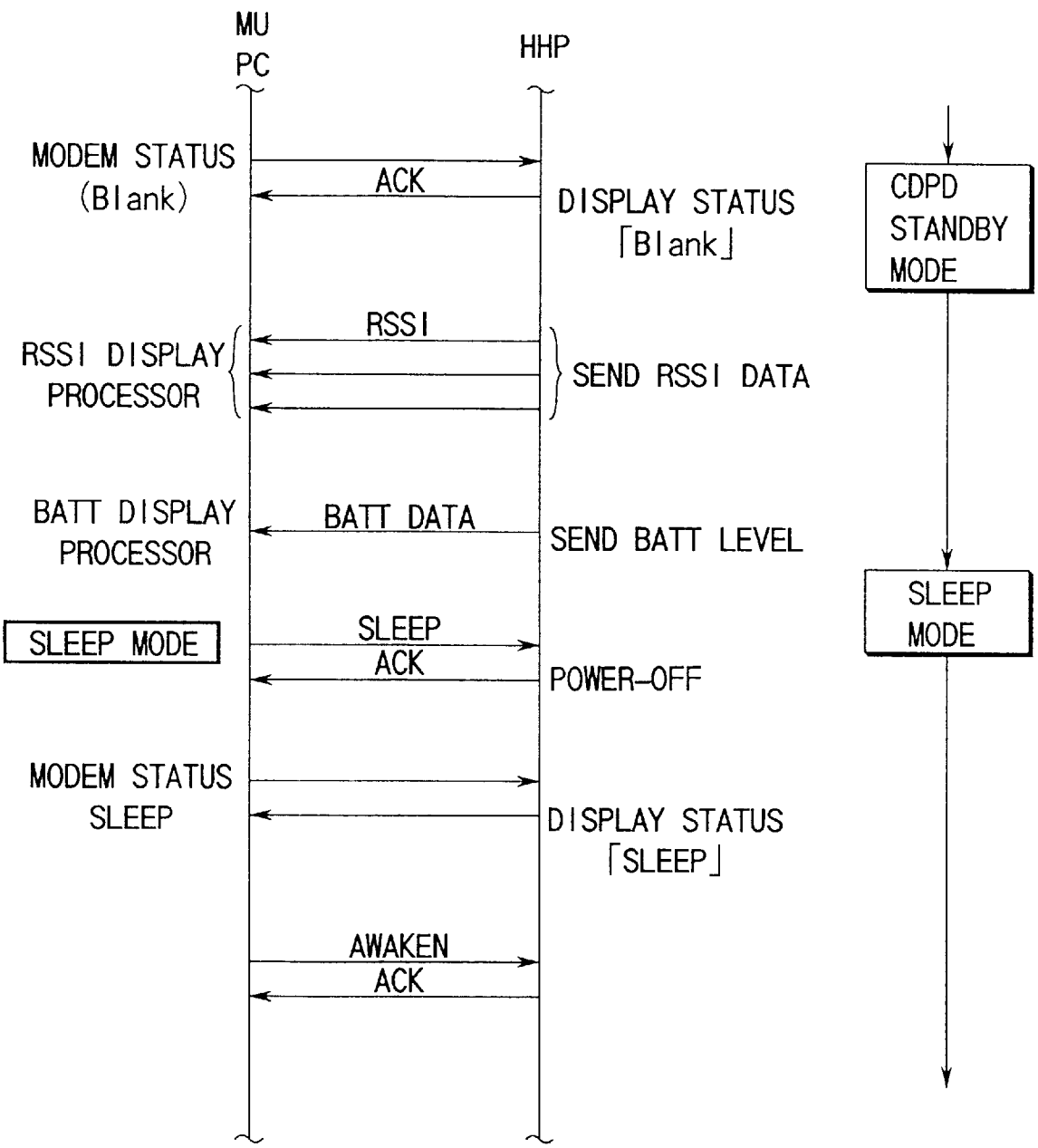
FIG. 11 is a sequence chart showing exchange of signals among the hand held phone HHP, modem unit MU, and personal computer PC.

The operation of the apparatus with the above arrangement will be explained below. FIGS. 6 to 8 are flow charts showing the operation procedure of the hand held phone HHP, and FIGS. 9 to 11 are sequence charts showing the exchange of signals among the hand held phone HHP, modem unit MU, and personal computer PC.

When the user turns on the power switch of the hand held phone HHP, the hand held phone HHP initializes the individual circuits therein in step 3a and selects a control channel in step 3b, as shown in FIG. 6. The hand held phone HHP sets the selected control channel in the synthesizer, and thereafter, is set in a standby state. More specifically, the standby state in the AMPS mode is set (step 3c). At this time, the control data transfer rate between the hand held phone HHP and the personal computer PC is set at a low-speed rate (9.6 kbps).

In this state, when an incoming call signal arrives from the base station (not shown) via the control channel, the hand held phone HHP performs call termination response processing in accordance with a predetermined protocol in the AMPS mode. When the user answers the call by operating the function key, the user and the calling party can talk in the AMPS mode. When the user operates the call origination key on the hand held phone HHP and then dials, the hand held phone HHP performs call origination processing in accordance with a predetermined protocol in the AMPS mode. If a user at the other end system answers the phone, the calling party and the user at the other end system can talk in the AMPS mode.

In the standby state, assume that the user inputs a CDPD command at the keyboard 44 of the personal computer PC to perform CDPD communications. In response to the input command, the microprocessor 41 of the personal computer PC supplies a CDPD request command to the control circuit 16 of the hand held phone HHP via the control processor 32 and the control serial interface 312 of the modem unit MU.

Upon detection of the CDPD request command in step 3d, the control circuit 16 of the hand held phone HHP sends back the CDPD request command directly as a CDPD request acknowledgment command (ACK) to the personal computer PC, as shown in FIG. 9. At the same time, the flow advances to step 3e, and the control circuit 16 sets the CDPD mode and inactivates circuits used in only the AMPS mode. Upon setting of the CDPD mode, processing for activating the modem, and changing the control data transfer rate between the hand held phone HHP and the personal computer PC to a high-speed rate (76.8 kbps) is performed. Hence, thereafter, control data transfer between the modem unit MU and the hand held phone HHP is performed at high speed, and control such as channel search (to be described later) or the like is performed within a short period of time. The circuits to be inactivated include, e.g., the key input unit 18, microphone 22, loudspeaker 23, and signal processors 141 and 142 in the baseband circuit 13. In this manner, the apparatus is set in the CDPD mode.

When the CDPD mode is set, the personal computer PC executes control for searching for a CDPD channel. More specifically, the personal computer PC sends status data "SEARCHING" representing that it has entered a CDPD channel search mode to the control circuit 16 of the hand held phone HHP via the modem unit MU. The control circuit 16 of the hand held phone HHP sends back the received status data as a reception acknowledgment ACK to the personal computer PC. Also, the control circuit 16 interprets the status data, and outputs it to the LCD driving circuit 19 to display "SEARCHING" on the LCD 20. Hence, the user can confirm the operation mode of the apparatus by also observing the LCD 20 of the hand held phone HHP.

Subsequently, the personal computer PC selects one of a plurality of voice channels assigned in advance, and sends the selected channel data to the control circuit 16 of the hand held phone HHP via the modem unit MU. The hand held phone HHP sends back the channel data as a channel data reception acknowledgment ACK. Also, the hand held phone HHP designates a reception channel in the synthesizer of the modulation circuit 111, measures RSSI information of that voice channel, and transmits the measurement data to the personal computer PC. The personal computer PC checks the use state of the designated channel based on the measurement data, and if the channel is busy, the personal computer PC selects another voice channel and sends the selected channel data to the hand held phone HHP. Thereafter, the personal computer PC similarly repeats the channel search control until it finds an idle voice channel.

When an idle voice channel is found, the personal computer PC sends status data "Blank" to the hand held phone HHP, as shown in FIG. 10. Upon reception of the status data "Blank", the control circuit 16 of the hand held phone HHP sends it back as a reception acknowledgment ACK to the personal computer PC, and displays the status data "Blank" on the LCD 20. Subsequently, the personal computer PC sends control data for setting the control data transfer rate at a low-speed rate to the hand held phone HHP. Upon reception of this control data, the hand held phone HHP changes the data transfer rate with the personal computer PC to a low-speed rate (9.6 kbps). In this manner, the apparatus transits to the standby state in the CDPD mode.

Accordingly, in the standby state in the CDPD mode, control data transfer between the hand held phone HHP and the personal computer PC is performed at low speed, and the consumption power of the hand held phone HHP is reduced to prolong the battery life.

Note that the control data transfer rate includes six rates, i.e., 9.6 kbps, 14.4 kbps, 19.2 kbps, 38.4 kbps, 57.6 kbps, and 76.8 kbps in the ascending order. The user can select and set an appropriate rate from these rates. FIG. 24 shows the relationship between these control data transfer rates and control data codes for setting these rates.

Figure 15:
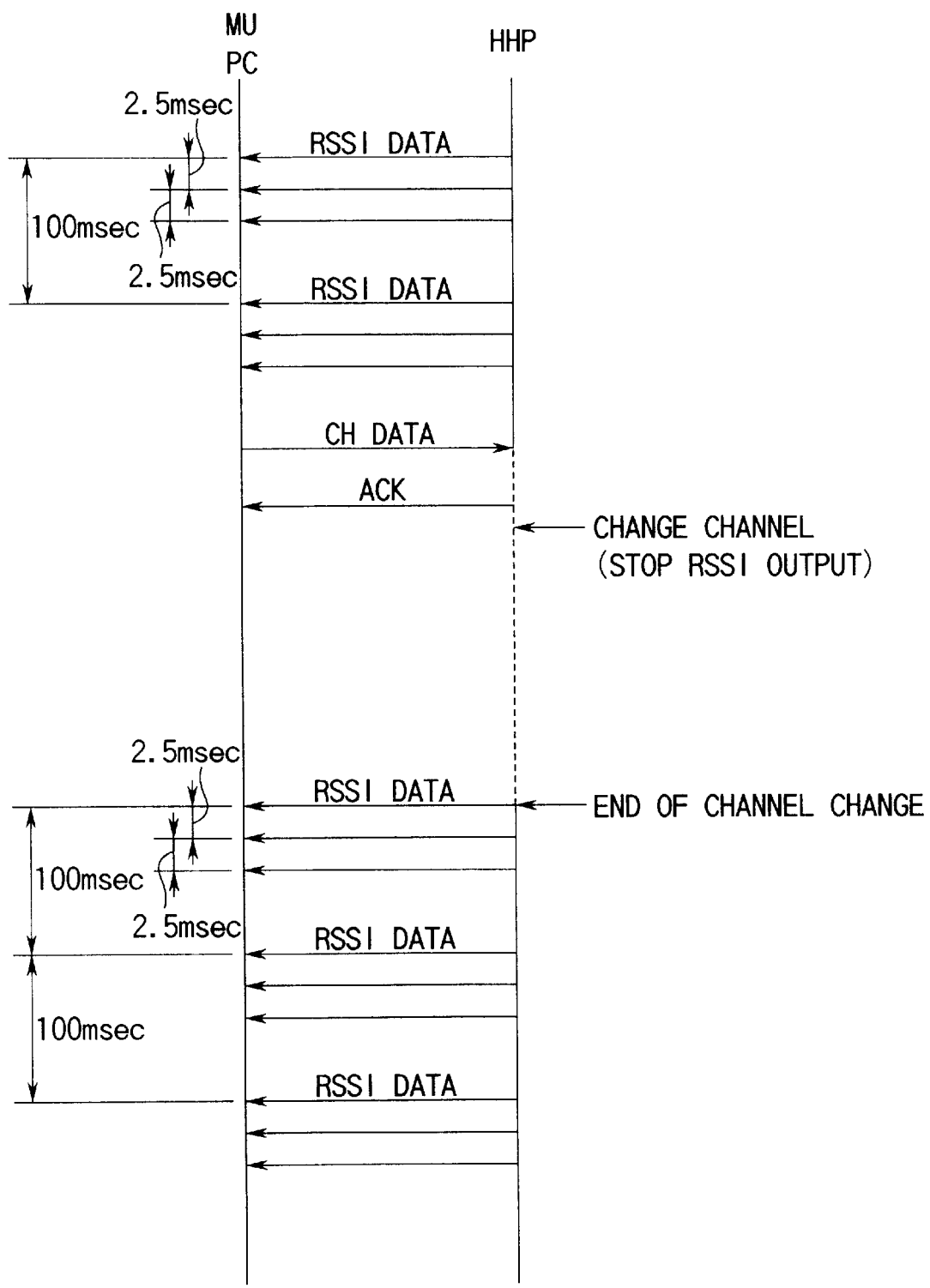
FIG. 15 is a sequence chart showing the measurement/transfer timings of RSSI data.

During the above-mentioned CDPD channel search period and CDPD standby period, the control circuit 16 of the hand held phone HHP periodically transfers the received signal strength indicator data (RSSI data) to the personal computer PC in step 3h. The RSSI data transfer is attained by transmitting RSSI data three times at 2.5-msec intervals every 100 msec, as shown in, e.g., FIG. 15.

Figure 16:
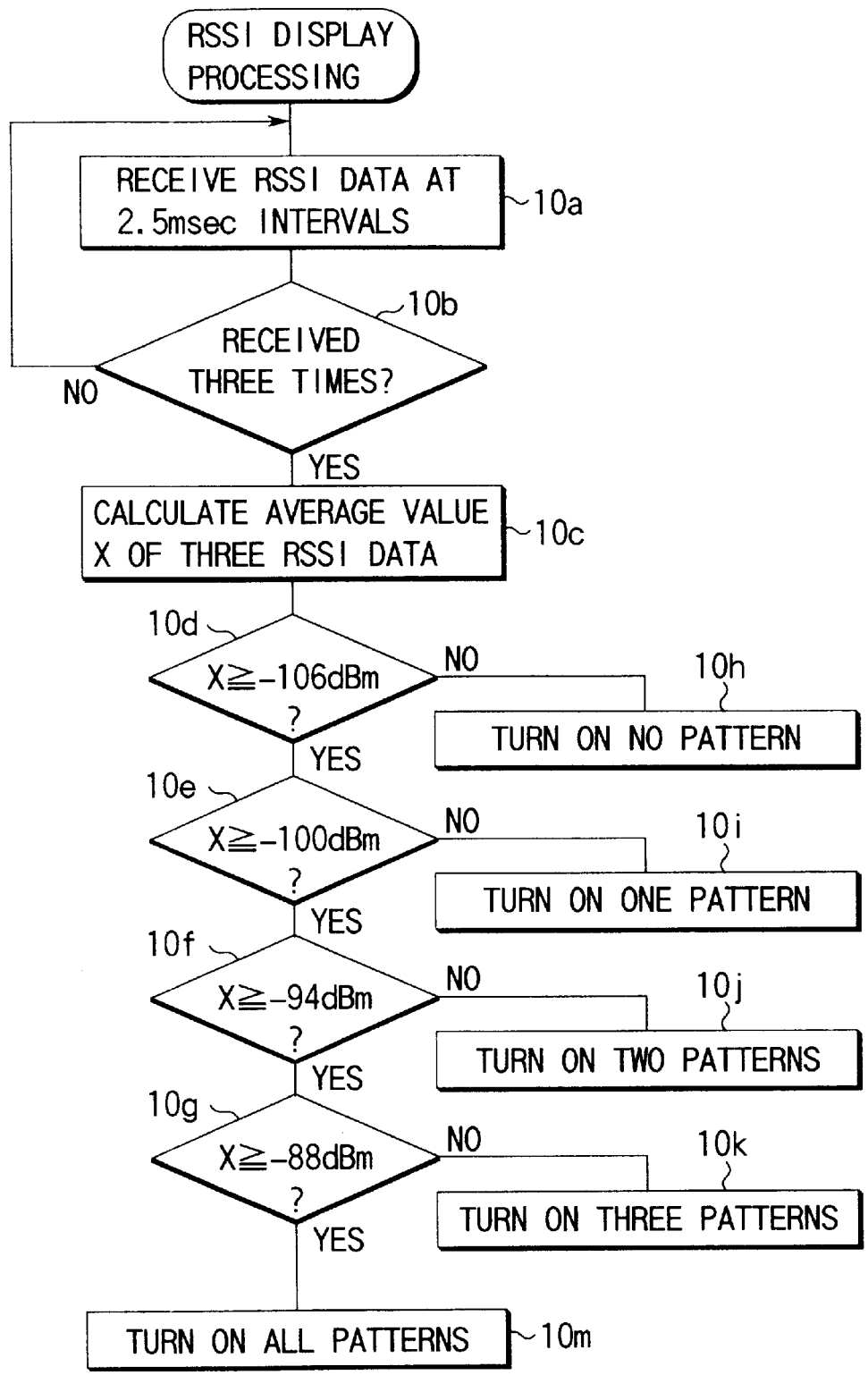
FIG. 16 is a flow chart showing the display control procedure of RSSI information in the personal computer PC.

When the RSSI data is input, the personal computer PC performs RSSI information display control as follows. FIG. 16 is a flow chart showing the procedure and contents of that display control. More specifically, when the RSSI data is input, the personal computer PC receives the RSSI data at 2.5-msec intervals in step 10a. If the personal computer PC confirms in step 10b that the RSSI data have been received three times, it calculates an average value x of the three RSSI data in step 10c. Then, the personal computer PC checks the level of the RSSI average value x in steps 10d to 10 g in turn, and displays the checking results on the LCD display 46 in steps 10h to 10m.

In step 10d, it is checked if the RSSI average value x is equal to or larger than −106 dBm. If NO in step 10d, the flow advances to step 10h, and none of RSSI indication patterns are turned on, as shown in FIG. 18A. Subsequently, it is checked in step 10e if the RSSI average value x is equal to or larger than −100 dBm. If NO in step 10e, the flow advances to step 10i, and one RSSI indication pattern is turned on, as shown in FIG. 18B. It is checked in step 10f if the RSSI average value x is equal to or larger than −94 dBm. If NO in step 10f, the flow advances to step 10j, and two RSSI indication patterns are turned on, as shown in FIG. 18C. Finally, it is checked in step 10g if the RSSI average value x is equal to or larger than −88 dBm. If NO in step 10g, the flow advances to step 10k, and three RSSI indication patterns are turned on, as shown in FIG. 18D; otherwise, the flow advances to step 10m, and all the four RSSI indication patterns are turned on, as shown in FIG. 18E.

Hence, while the user performs operations for CDPD transmission at the personal computer PC, he or she can check the radio wave reception state at the hand held phone HHP without observing the LCD 20 of the hand held phone HHP.

Note that the RSSI indication patterns are displayed by forming a window on the upper right corner on the LCD display 46 of the personal computer PC, as shown in, e.g., FIG. 17.

Figure 19:
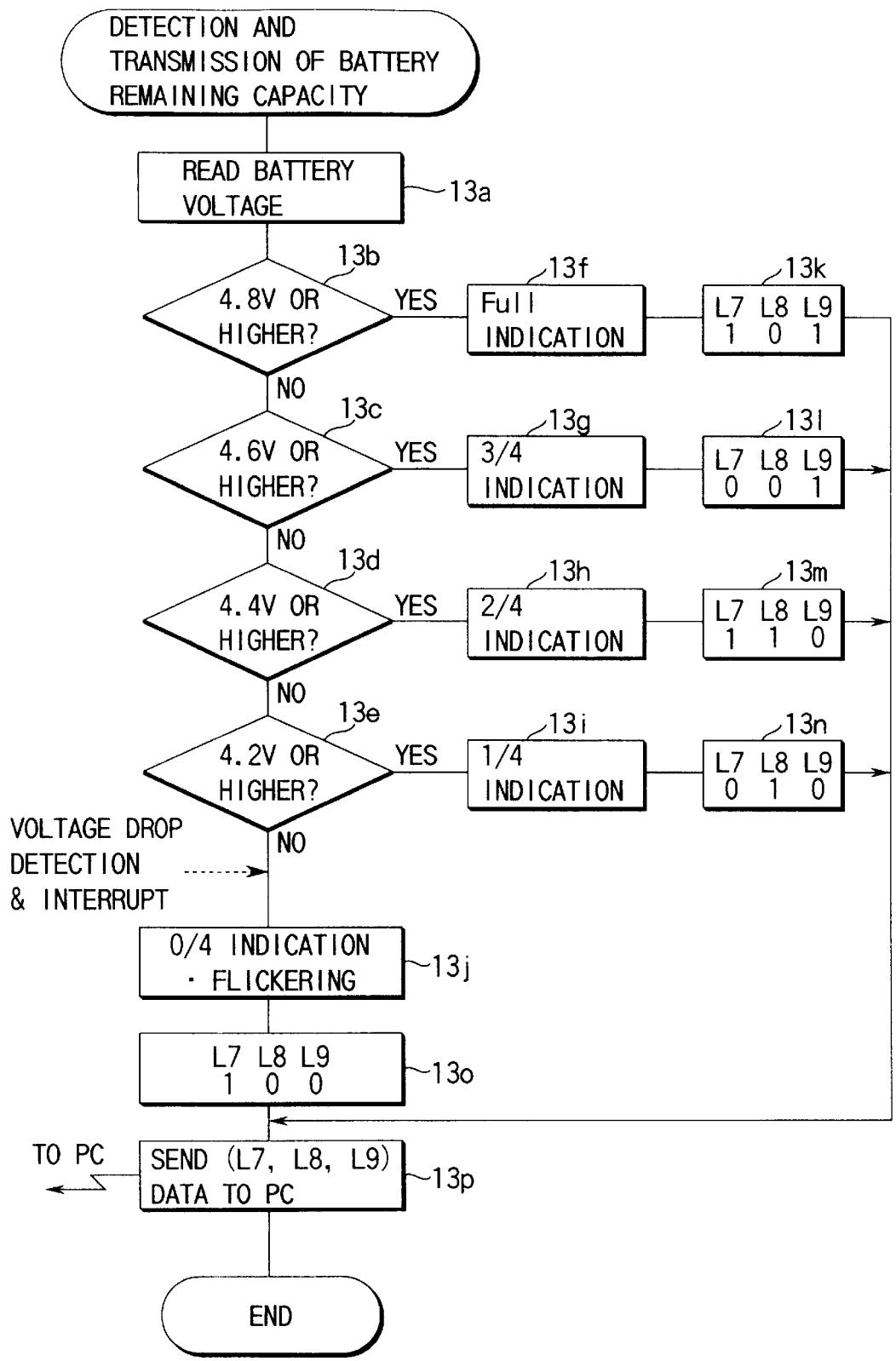
FIG. 19 is a flow chart showing the battery remaining capacity detection/output control procedure in the hand held phone HHP.

Also, during the above-mentioned CDPD channel search period and CDPD standby period, the control circuit 16 of the hand held phone HHP periodically detects the battery capacity remaining in the power supply circuit and performs transfer control of the detection data (BATT data) in step 3h. FIG. 19 is a flow chart showing the procedure and contents of that control, and FIG. 20 is a timing chart showing the operation.

Figures 20, 21:
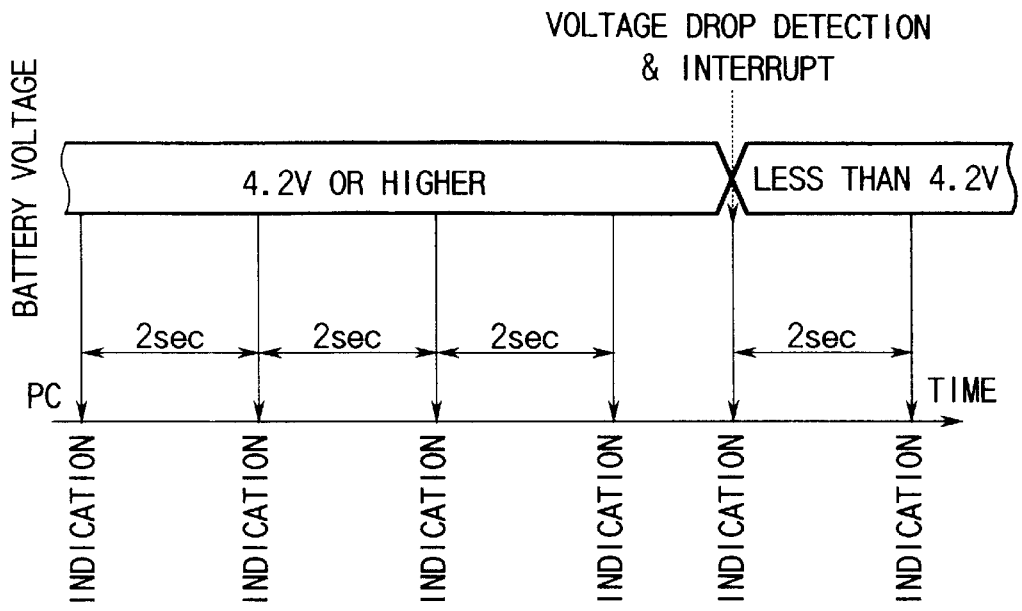
FIG. 20 is a chart showing the detection/display timings of the battery remaining capacity.
FIG. 21 is a table showing the relationship among the battery voltage values, their functions, and status data.

More specifically, the control circuit 16 of the hand held phone HHP reads the output voltage value $V_{CC}$ from the battery at 2-sec intervals in step 13a, and compares the output voltage value $V_{CC}$ with different threshold values to check level in steps 13b to 13e, as shown in FIG. 20. The control circuit 16 determines indication modes corresponding to the checking results in steps 13f to 13j, converts the determined indication modes to 3-bit status change report data in steps 13k to 13o, and transfers the status change report data to the personal computer PC in step 13p.

For example, the control circuit 16 checks in step 13b if the battery output voltage value $V_{CC}$ is equal to or larger than 4.8V. If YES in step 13b, the control circuit 16 determines the fully charged state, and selects a Full indication mode in step 13f. The control circuit 16 then converts the Full indication mode into 3-bit status change report data L7, L8, L9=1, 0, 1 in step 13k. The control circuit 16 transfers the status change report data to the personal computer PC in step 13p. Upon reception of the status change report data, the personal computer PC turns on the entire region of a battery capacity remaining indication pattern (FIG. 17) displayed on the LCD display 46, as shown in FIG. 22A.

Subsequently, the control circuit 16 checks in step 13c if the battery output voltage value $V_{CC}$ is equal to or larger than 4.6V. If YES in step 13c, the control circuit 16 determines a 3/4 indication mode in step 13g, and converts the 3/4 indication mode into 3-bit status change report data L7, L8, L9=0, 0, 1 in step 13l. The control circuit 16 outputs the status change report data to the personal computer PC in step 13p. Upon reception of the status change report data, the personal computer PC turns on a 3/4 region of the battery capacity remaining indication pattern displayed on the LCD display 46, as shown in FIG. 22B.

Similarly, the control circuit 16 checks in step 13d if the battery output voltage value $V_{CC}$ is equal to or larger than 4.4V. If YES in step 13d, the control circuit 16 determines a 2/4 indication mode in step 13g, and converts the 2/4 indication mode into 3-bit status change report data L7, L8, L9 =1, 1, 0 in step 13m. The control circuit 16 outputs the status change report data to the personal computer PC in step 13p. Upon reception of the status change report data, the personal computer PC turns on a 2/4 region of the battery capacity remaining indication pattern displayed on the LCD display 46, as shown in FIG. 22C.

Finally, the control circuit 16 checks in step 13e if the battery output voltage value $V_{CC}$ is equal to or larger than 4.2V. If YES in step 13e, the control circuit 16 determines a 1/4 indication mode in step 13i, and converts the 1/4 indication mode into 3-bit status change report data L7, L8, L9=0, 1, 0 in step 13n. The control circuit 16 outputs the status change report data to the personal computer PC in step 13p. Upon reception of the status change report data, the personal computer PC turns on a 1/4 region of the battery capacity remaining indication pattern displayed on the LCD display 46, as shown in FIG. 22D.

On the other hand, if the battery output voltage value $V_{CC}$ is less than 4.2V, the control circuit 16 determines that the battery is in the "DISCHARGE" state, and determines a 0/4 indication·flickering mode in step 13j. Then, the control circuit 16 outputs status change report data L7, L8, L9=1, 0, 0 to the personal computer PC in step 13p. Upon reception of the status change report data, the personal computer PC flickers only the contour of the battery capacity remaining indication pattern displayed on the LCD display 46, as shown in FIG. 22E.

Furthermore, when the low voltage detection circuit 25 detects at an intermediate timing of the detection period (2 sec) of the battery output voltage shown in FIG. 20 that the battery voltage $V_{CC}$ has dropped below 4.2V, a low voltage detection signal is input to the interrupt terminal of the control circuit 16 at that time. In response to this signal, the flow advances to step 13j, and the control circuit 16 determines a 0/4 indication·flickering mode and outputs status change report data L7, L8, L9=1, 0, 0 to the personal computer PC in step 13p, as shown in FIG. 19. Upon reception of the status change report data, the personal computer PC flickers only the contour of the battery capacity remaining indication pattern displayed on the LCD display 46, as shown in FIG. 22E.

In this manner, the battery capacity remaining information of the hand held phone HHP is displayed on the LCD display of the personal computer PC in the CDPD mode. Hence, even when the user performs operations for CDPD communications at the personal computer PC, he or she can always check the battery capacity remaining of the hand held phone HHP.

Note that FIG. 21 shows a list of the relationship among the battery voltage values $V_{CC}$, their functions, and status change report data (L7, L8, L9). Note that other bits L0 to L6 of the status change report data are respectively assigned to inform the personal computer PC of L6: incoming call, L5: call disconnection, L4: system access errors, L3: successful connection, L2: call interrupt, L1: hand-off start, and L0: hand-off end.

On the other hand, during the standby period in the CDPD mode, the control circuit 16 of the hand held phone HHP monitors the power-OFF operation at the hand held phone HHP in step 4a, and also monitors an incoming CDPD call origination command in step 4b, as shown in FIG. 7. In this state, when the CDPD call origination command comes from the personal computer PC via the modem unit MU, the control circuit 16 of the hand held phone HHP directly sends back the incoming CDPD call origination command as a call origination command reception acknowledgment ACK to the personal computer PC. At the same time, the control circuit 16 changes the control data transfer rate with the personal computer PC to a high-speed rate (76.8 kbps). Upon reception of the call origination command reception acknowledgment ACK, the personal computer PC also changes the control data transfer rate to a high-speed rate (76.8 kbps).

The flow advances to step 4c, and the control circuit 16 of the hand held phone HHP originates a call signal. The control circuit 16 checks in step 4d is call origination is successful. If YES in step 4d, the flow advances to step 4e, and the control circuit 16 performs the transmission/reception operation of CDPD data. At that time, status data "ACTIVE" comes from the personal computer PC. Upon reception of the status data "ACTIVE", the control circuit 16 of the hand held phone HHP displays it on the LCD 20.

Figure 25:
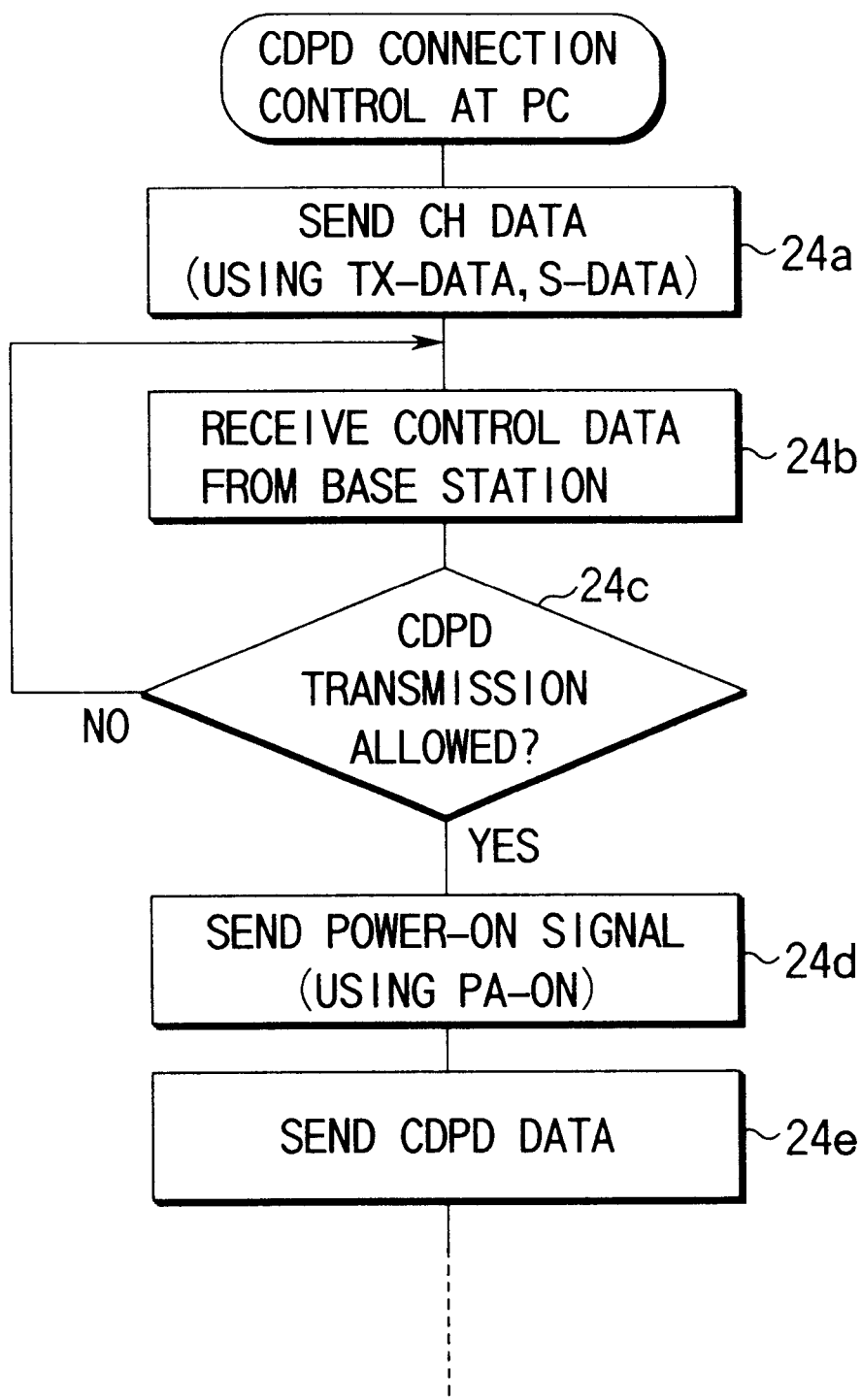
FIG. 25 is a flow chart showing the CDPD connection control procedure in the personal computer PC.
Figure 26:
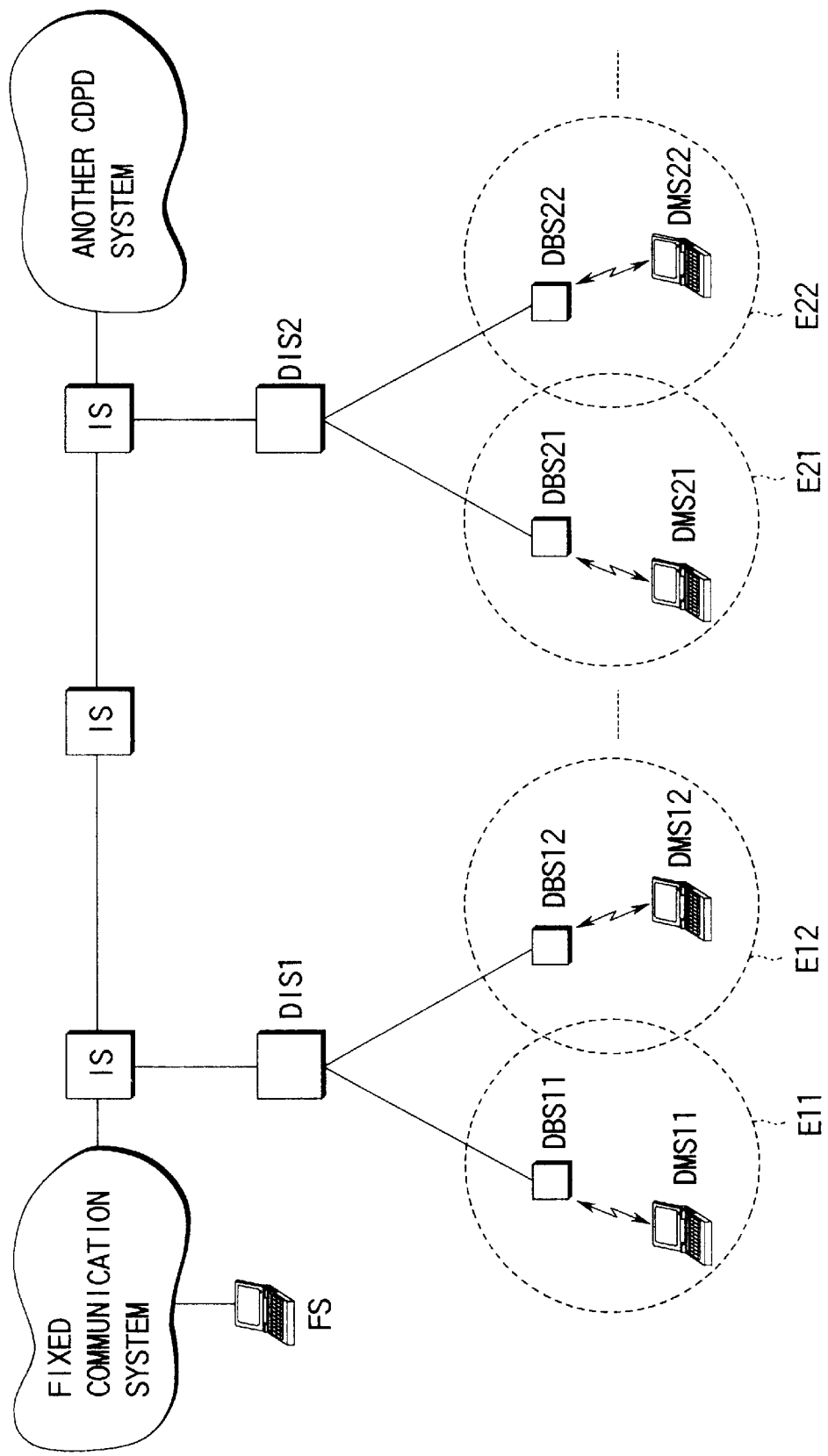
FIG. 26 is a schematic diagram of a cellular mobile communication network system with a CDPD service function.
Figure 27:
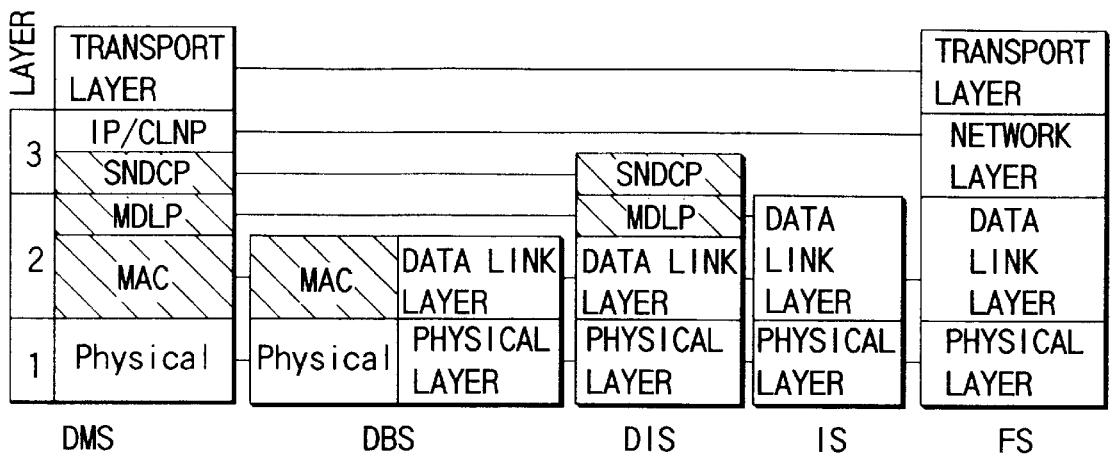
FIG. 27 shows the hierarchical structure of the CDPD protocol.
Figure 28:
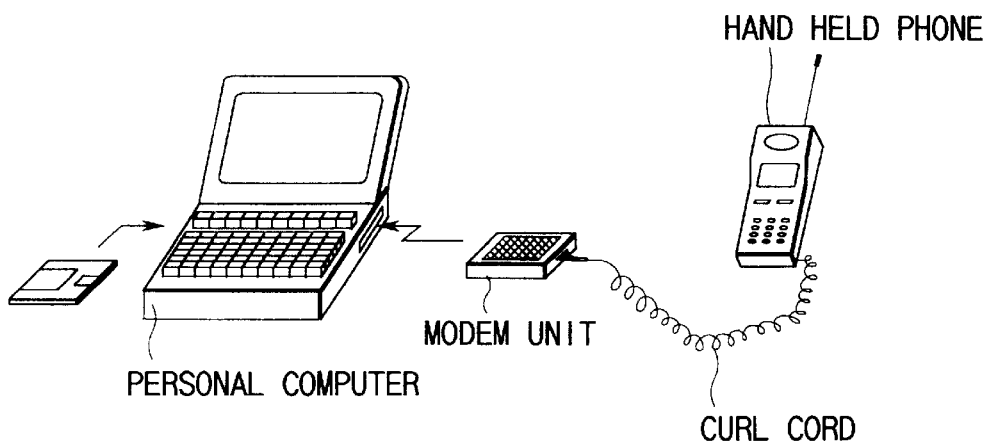
FIG. 28 is a perspective view depicting the arrangement of a data communication mobile station.

During the transition period from the above-mentioned CDPD standby state to CDPD communications, the personal computer PC exchanges control data and control signals, as shown in FIG. 25. More specifically, in step 24a channel data is output onto the signal line TX-DATA. For this reason, the channel data is transferred to the control circuit 16 of the hand held phone HHP via the modem unit MU, and is further transferred from the control circuit 16 to the baseband circuit 13 via the bus S-DATA. After the channel data is converted into a signal format suitable for radio transmission in the baseband circuit 13, the converted data is radio-transmitted from the radio circuit to the base station. In step 24b, control data coming from the base station is monitored. The transfer route of the received control data extends from the baseband circuit 13 of the hand held phone HHP via the bus S-DATA, the control circuit 16, the signal line RX-DATA, and the modem unit MU.

If it is confirmed in step 24c that CDPD communications are ready, the personal computer PC outputs a power-ON control signal to the hand held phone HHP in step 24d. At this time, the power-ON control signal is directly transferred from the modem unit MU to the power supply circuit 125 of the hand held phone HHP via the power-ON/OFF control dedicated signal line PA-ON. Upon reception of the power-ON control signal, the power supply circuit 125 powers the transmission power amplifier 113 at that time to set it in the transmission ON state. When the transmission power amplifier 113 is set in the transmission ON state, the flow advances to step 24e, and the personal computer PC starts transmission of CDPD data.

More specifically, in the above-mentioned control signal transfer operations, control data such as channel data or the like is transferred via the control circuit 16 of the hand held phone HHP, but the power-ON control signal is directly transferred to the power supply circuit 125 of the hand held phone HHP via the power-ON/OFF control dedicated signal line PA-ON. For this reason, the power-ON control signal is transferred to the power supply circuit 125 of the hand held phone HHP without any delay, and the transmission power amplifier 113 is immediately set in the transmission ON state. Hence, the personal computer PC can start transmission of CDPD data immediately after it outputs the power-ON control signal without a delay in the transmission start timing of CDPD data.

On the other hand, control data such as channel data, that is less urgent is transferred via the control circuit 16 of the hand held phone HHP together with other control data. For this reason, no dedicated signal line is arranged, and the number of signal lines can be reduced to realize a simple, compact arrangement.

When transmission/reception of CDPD data is started, the control circuit 16 of the hand held phone HHP monitors a power-OFF command and an end command coming from the personal computer PC in steps 4f and 4g, as shown in FIG. 7. Upon reception of the end command, the control circuit 16 performs CDPD transmission/reception end processing (e.g., releasing a radio channel) in step 4h, and thereafter, returns to the standby state in the CDPD mode. At that time, the control circuit 16 receives status data "Blank" from the personal computer PC. Upon reception of the status data "Blank", the control circuit 16 of the hand held phone HHP displays it on the LCD 20.

On the other hand, assume that the power-OFF command comes from the personal computer PC during transmission/reception of CDPD data. In response to this command, the flow advances to step 5i in FIG. 8, and the control circuit 16 of the hand held phone HHP directly sends back the power-OFF command as a power-OFF command reception acknowledgment ACK to the personal computer PC. In step 5h, the control circuit 16 executes processing for turning off the power supply of the hand held phone HHP. In this manner, the hand held phone HHP is turned off.

In the CDPD standby mode, the hand held phone HHP also monitors an incoming CSCD command and sleep command. In this state, assume that the CSCD command comes from the personal computer PC. Then, the hand held phone HHP transits to the CSCD mode.

When the CSCD mode is set, connection control with the base station is performed under the control of the control circuit 16 of the hand held phone HHP. During this connection control, the control circuit 16 of the hand held phone HHP generates status data representing its own operation state, and transmits the status data to the personal computer PC via the modem unit MU. When the personal computer PC receives the status data from the hand held phone HHP, the microprocessor 41 displays the status data on the LCD display 46. In this case, the status data is displayed together with the above-mentioned RSSI information and battery remaining capacity information in the window set at the upper right corner on the display, as shown in, e.g., FIG. 17.

FIG. 23 shows the types of status data exchanged between the personal computer PC and the hand held phone HHP and their code formats. Each status data is transferred between the personal computer PC and the hand held phone HHP using 3-bit code data M0, M1, and M2.

In this manner, since the operation state of the hand held phone HHP is transferred to the personal computer PC and is displayed on the LCD display 46, the user can detect the state of the radio channel connection control at the hand held phone HHP while operating the personal computer PC. For example, when connection control results in errors, the user can confirm whether the errors are caused by "NO SERVICE" or a busy state by checking the status data displayed on the LCD display PC of the personal computer 46 without observing the LCD 20 of the hand held phone HHP.

Assume that the sleep command (SLEEP) comes from the personal computer PC in the CDPD standby mode, as shown in FIG. 11. In response to this command, the control circuit 16 of the hand held phone HHP stops power supply to the radio circuit 12 and the like, thus setting a sleep mode with a high battery saving effect. At this time, status data indicating the sleep mode is sent from the personal computer PC and is displayed on the LCD 20 of the hand held phone HHP. Hence, the user can confirm the sleep mode by observing the LCD 20 of the hand held phone HHP in place of the LCD display 46 of the personal computer. Note that this sleep mode is canceled by an awaken command (AWAKEN) coming from the personal computer PC, and the hand held phone HHP returns to the normal CDPD standby mode.

On the other hand, assume that the user turns off the power switch of the hand held phone HHP during data communications or the standby period in the CDPD mode so as to start, e.g., conversation with somebody using the hand held phone HHP. In response to this operation, the control circuit 16 of the hand held phone HHP generates a power-OFF request command in step 5a, as shown in FIG. 8, and sends this command to the personal computer PC via the modem unit MU. After the power-OFF request command is output, the control circuit 16 monitors a power-OFF instruction command and a power-ON instruction command coming from the personal computer PC in steps 5d and 5e while monitoring an elapse of 10 msec in step 5b.

Figure 12:
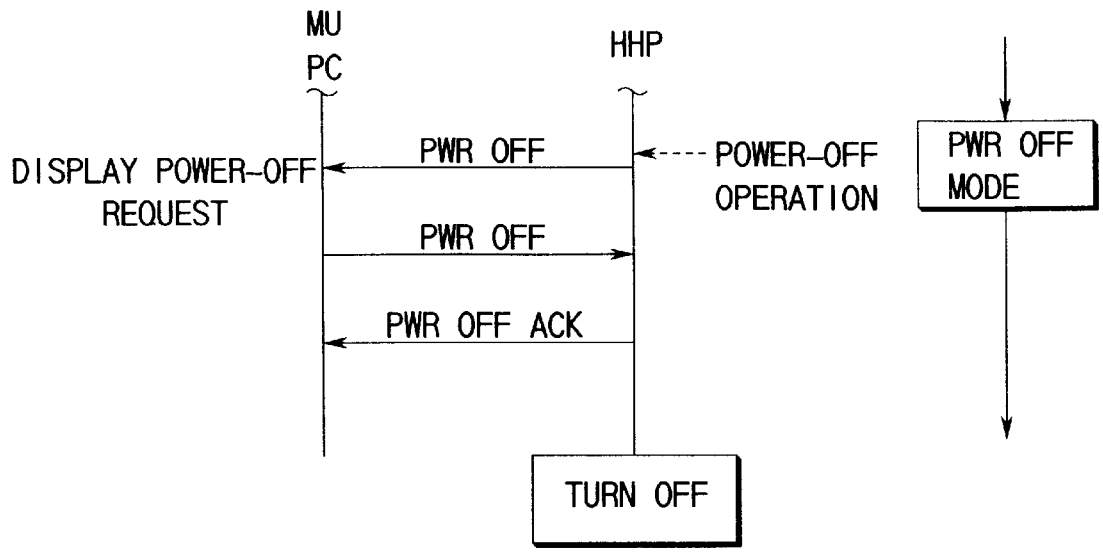
FIG. 12 is a sequence chart showing an example of the power-OFF procedure among the hand held phone HHP, modem unit MU, and personal computer PC.

When a power-OFF instruction command is input, as shown in FIG. 12, the flow advances to step 5i, and the control circuit 16 of the hand held phone HHP directly sends back the power-OFF instruction command as a power-OFF instruction reception acknowledgment ACK to the personal computer PC. Thereafter, the control circuit 16 performs processing (turn-off processing) for turning off the power supply of the hand held phone HHP in step 5h.

Figure 13:
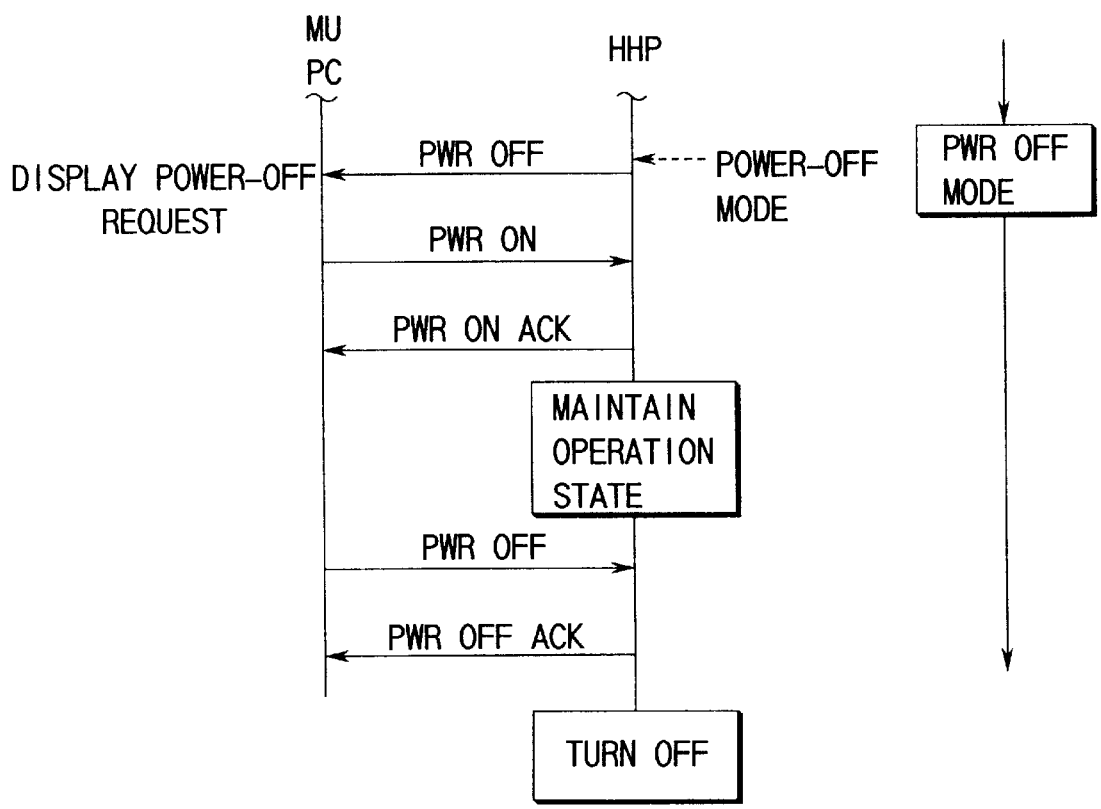
FIG. 13 is a sequence chart showing another example of the power-OFF procedure among the hand held phone HHP, modem unit MU, and personal computer PC.

In contrast to this, assume that the CDPD communications have not ended at the time of reception of the power-OFF request command from the hand held phone HHP, and the personal computer PC outputs a power-ON instruction command, as shown in FIG. 13. Then, the flow advances to step 5f, and the control circuit 16 of the hand held phone HHP directly sends back the power-ON instruction command as a power-ON instruction reception acknowledgment ACK to the personal computer PC. Thereafter, the control circuit 16 maintains the individual circuits in the hand held phone HHP in the operative state until it is confirmed in step 5g that a power-OFF instruction command is input from the personal computer PC. During this interval, the personal computer PC can complete the CDPD procedure in progress or can execute at least a procedure for releasing a communication link with the base station.

When the power-OFF request command is input, the personal computer PC displays a message indicating this on the LCD display 46. Hence, even when a user who is performing data communications at the personal computer PC is different from a user who is about to start conversation using the hand held phone HHP, the user who is operating the personal computer PC can be informed of the power-OFF operation at the hand held phone HHP.

Figure 14:
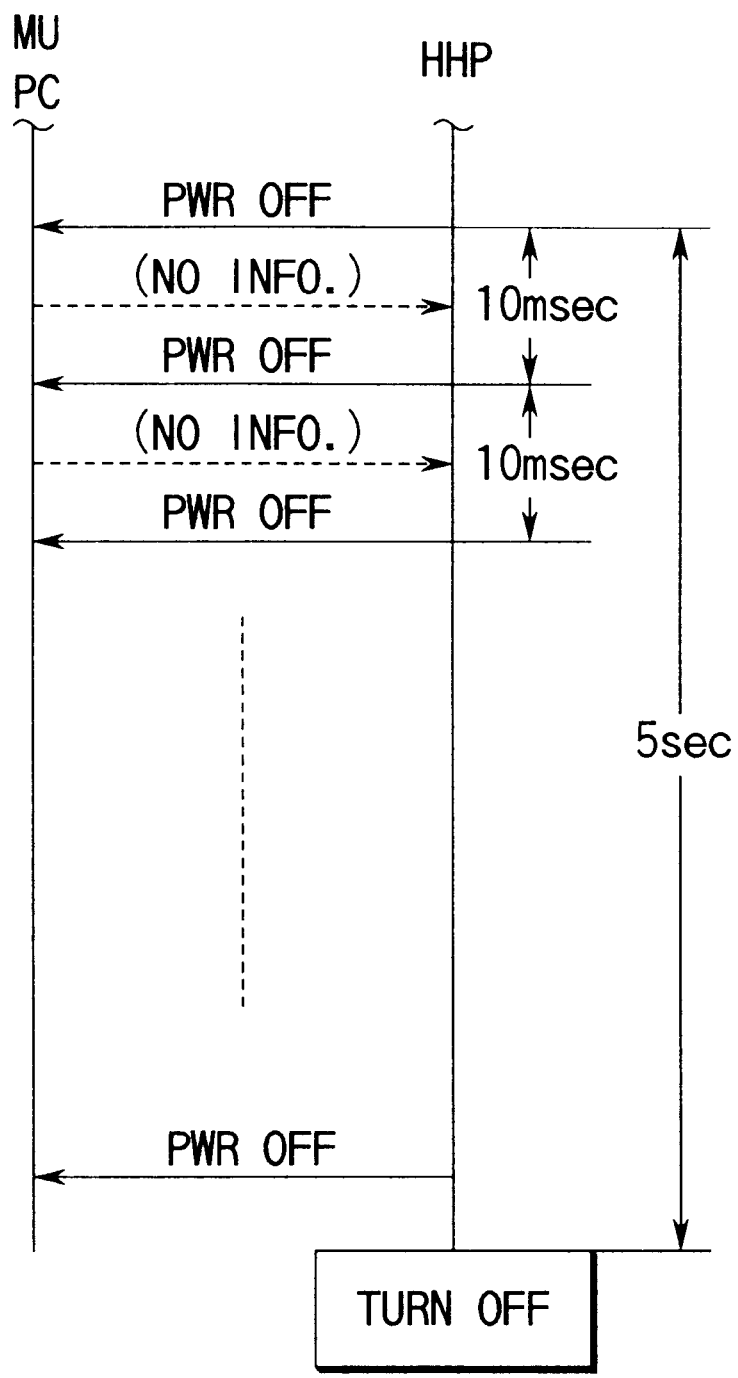
FIG. 14 is a sequence chart showing still another example of the power-OFF procedure among the hand held phone HHP, modem unit MU, and personal computer PC.

On the other hand, assume that the hand held phone HHP repetitively transmits the power-OFF request commands at 10-msec intervals, as shown in FIG. 14, but 5 seconds have passed while neither the power-OFF instruction command nor the power-ON instruction command come from the personal computer PC. In this case, the flow advances from step 5c to step 5h, and the control circuit 16 of the hand held phone HHP executes power-OFF (turn-off) processing of the hand held phone HHP.

Hence, if the microcomputer 41 of the personal computer PC has run away, or interfacing between the personal computer PC and the modem unit MU or between the modem unit MU and the hand held phone HHP has failed, and consequently, the hand held phone HHP cannot receive any power-OFF instruction command, the hand held phone HHP returns to the power-OFF state 5 msec after the first power-OFF request was output. For this reason, wasteful power consumption at the hand held phone HHP can be reduced, and the battery life can be extended.

As described above, according to this embodiment, during the CDPD mode period, RSSI data and battery capacity remaining determination data measured by the hand held phone HHP are periodically transferred to the personal computer PC, and are displayed on the LCD display 46. Also, during the CDPD mode period, status data representing the operation state of the personal computer PC is transferred to the hand held phone HHP, and is displayed. Furthermore, during the CSCD mode period, status data representing the operation state of the hand held phone HHP is transferred to the personal computer PC, and is displayed on the LCD display 46.

Therefore, according to this embodiment, as the RSSI information and the battery capacity remaining information that can only be checked at the hand held phone HHP in the CDPD mode in the conventional system can also be displayed on the personal computer PC, the user can easily check the state of the hand held phone HHP side while operating the personal computer PC.

Also, since the status data representing the operation state of the personal computer PC is also displayed on the hand held phone HHP in the CDPD mode, even when the user adjusts the posture of the hand held phone HHP at a position separate from the personal computer PC, he or she can recognize the operation state of the personal computer PC.

Furthermore, in the CSCD mode in which the hand held phone HHP mainly performs connection control, since the status data representing the operation state of the hand held phone HHP is transferred to and displayed on the personal computer PC, the user can check the connection control state of the hand held phone HHP at the personal computer PC.

When the power-OFF operation is performed at the hand held phone HHP, the hand held phone HHP sends an inquiry to the personal computer PC using a power-OFF request command. In response to this inquiry, if data communications are in progress, the personal computer PC sends a power-ON instruction command to the hand held phone HHP to maintain the operation state of the hand held phone HHP. Accordingly, the power supply of the hand held phone HHP can be prevented from being suddenly turned off during the data transmission procedure, and can be reliably turned off after the data transmission procedure or the radio channel release procedure is completed.

In addition, the hand held phone HHP automatically returns to the power-OFF state when 5 msec have elapsed without any power-OFF instruction command after it sent the first power-OFF request. For this reason, wasteful power consumption at the hand held phone HHP can be reduced, and the battery life can be prolonged.

Furthermore, upon reception of a command from the personal computer PC, the hand held phone HHP directly sends back the received command as a reception acknowledge command to the personal computer PC, and the personal computer PC compares the command sent back as the reception acknowledge command with the transmitted command to check if the two commands coincide with each other, thereby enabling confirmation of reception at the hand held phone HHP.

Accordingly, the hand held phone HHP need not generate dedicated ACK commands in response to the individual input commands, and the ACK procedure can be simplified. On the other hand, since the personal computer is capable of confirmation of reception at the hand held phone HHP by comparing the transmitted and received commands, the confirmation procedure can be simplified.

Furthermore, a control signal such as a power-ON/OFF control signal, that requires immediate signal transfer between the modem unit MU and the hand held phone HHP is directly transferred to the circuit via the dedicated signal line. On the contrary, control data such as status display data, that is less urgent is transferred via the control circuit 16 of the hand held phone HHP using the bus transmission path.

Accordingly, as for urgent operation control like in a case wherein the transmission power amplifier 113 of the hand held phone HHP is turned on under the control of the personal computer PC, since the control signal is transferred via the dedicated signal line PA-ON, high-speed control can be realized. In this manner, the transmission start timing of CDPD data can be set earlier, and the transmission efficiency of CDPD data can be improved. The dedicated signal line is not arranged for all the control data or control signals, but control signals associated with operation control, that are less urgent are transferred by commonly using the signal transmission path S-DATA with the bus architecture. For this reason, as compared to a case wherein dedicated signal lines are arranged in units of control lines, the number of signal lines can be greatly reduced, and a size reduction of the apparatus can be realized.

Moreover, the control data transfer rate between the personal computer PC and the hand held phone HHP is set at a low-speed rate (9.6 kbps) in the standby state, and is changed to a high-speed rate (76.8 kbps) in the CDPD channel scan mode or CDPD data transmission/reception mode. For this reason, power consumption can be reduced in the standby mode to prolong the battery life. On the other hand, in the CDPD data transmission mode, the control associated with the transmission can be performed at high speed.

The present invention is not limited to the above embodiment. For example, in the above embodiment, the card-type modem unit MU is prepared in addition to the personal computer PC, and is inserted into the slot of the personal computer PC to accomplish CDPD communications. Alternatively, a personal computer PC which incorporates a circuit or application program corresponding to the modem unit MU may be prepared, and the hand held phone HHP may be connected to the personal computer PC to realize CDPD communications. Furthermore, a hand held phone HHP which incorporates a circuit or application program corresponding to the modem unit MU may be prepared, and may be connected to the personal computer PC to realize CDPD communications.

Upon transfer/display of RSSI information, the hand held phone HHP may calculate the average value of a plurality of RSSI data, compare it with a threshold value to determine the level, and send the determination data to the personal computer PC to display it on the personal computer PC.

Furthermore, the hand held phone HHP may measure RSSI data a plurality of times at predetermined time intervals every unit time. In the first measurement, the hand held phone HHP may directly transfer the measurement data to the personal computer PC, and in the second and subsequent measurements, the hand held phone HHP may send data representing the difference between the current measurement data and the previous measurement data to the personal computer PC. The personal computer PC may calculate the average value of measurement data per unit time on the basis of the first RSSI data and the subsequent difference data transferred from the hand held phone HHP, and compare the average value with a predetermined threshold value to display the comparison result as information representing the reception quality.

In this manner, as compared to a case wherein measurement data is directly transferred every time RSSI data is measured, the data volume of RSSI data to be transferred from the hand held phone HHP to the personal computer PC can be reduced.

Upon transfer/display of battery capacity remaining data, the hand held phone HHP may directly send the detection value data of the battery voltage to the personal computer PC, and the personal computer PC may compare the battery voltage detection data with a threshold value to determine the level and may display the determination result.

Furthermore, in the above embodiment, the hand held phone HHP measures the output voltage value $V_{CC}$ of the power supply circuit 21 at 2-sec intervals, and transfers the level determination data of the measurement data to the personal computer PC to display it, as shown in FIG. 17. Alternatively, the measurement interval may be set at a value other than 2 sec, or may be randomly set.

On the other hand, when the battery voltage value is equal to or larger than 4.6V, measurement, transfer, and display may be made at a long first period; when the voltage value drops below 4.6V, measurement, transfer, and display may be done at a second period shorter than the first period. Furthermore, when the battery voltage drops below 4.2V, measurement, transfer, and display may be done at a still shorter third period.

Furthermore, the remaining communication time of the hand held phone may be calculated on the basis of the battery voltage detection data, and may be displayed on the display of the personal computer.

Alternatively, the battery consumption amount or rate may be calculated on the basis of the battery voltage detection data, and may be displayed on the display of the personal computer.

Moreover, in the above embodiment, an analog hand held phone that uses, e.g., the AMPS scheme, is used to perform mobile data communications. However, the present invention is not limited to the analog hand held phone, and may be applied to mobile data communications using a digital hand held phone that uses a TDMA or CDMA scheme.

In addition, the arrangements of the hand held phone, modem unit, and personal computer, the transfer/display control procedures and contents of RSSI information and battery, capacity remaining information, the display patterns of the RSSI information and battery capacity remaining information, and the like may be variously modified within the scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A mobile communication terminal apparatus comprising:
   a hand held phone for exchanging a radio communication signal with a base station via a radio channel and using a battery as a power supply; and
   a data terminal device including,
      a control unit for performing mobile data communication with a data terminal device of a communication partner at least via said hand held phone and the base station, said control unit having a display unit, and
      a modem unit for connecting said control unit and said hand held phone and performing an interface operation for the mobile data communication under the control of said control unit,
   wherein said hand held phone comprises means for monitoring an operation state of said hand held phone and notifying said data terminal device of monitoring results while a mode for the mobile data communication is set, and
   wherein said data terminal device comprises means for generating information based on the monitoring results and displaying the generated information on the display unit of said control unit.

2. The mobile communication terminal apparatus according to claim 1,
   wherein said hand held phone further includes received signal strength measurement means for measuring a received signal strength of a radio channel which is being received, and transferring measurement data of the received signal strength to said data terminal device, while a mode for the mobile data communication is set, and
   wherein said data terminal device further includes reception quality display control means for generating information representing reception quality based on the measurement data of the received signal strength transferred from said hand held phone, and displaying the reception quality information on the display unit of said control unit.

3. An apparatus according to claim 1, wherein said received signal strength measurement means has a function of measuring the received signal strength a plurality of number of times at predetermined time intervals every unit time, and transferring the individual measurement data to said data terminal device, and
   said reception quality display control means calculates an average value of the plurality of measurement data per unit time transferred from said received signal strength measurement means, compares the average value with a predetermined threshold value, and displays the comparison result as the information representing the reception quality on said control unit.

4. An apparatus according to claim 1, wherein said received signal strength measurement means has a function of measuring the received signal strength a plurality of number of times at predetermined time intervals every unit time, directly transferring the measurement data to said data terminal device in the first measurement, and transferring data representing a difference between current measurement data and previous measurement data to said data terminal device in the second and subsequent measurements, and
   said reception quality display control means calculates an average value of measurement data per unit time on the basis of the data transferred from said received signal strength measurement means, compares the average value with a predetermined threshold value, and displays the comparison result as the information representing the reception quality on said control unit.

5. An apparatus according to claim 1, wherein said received signal strength measurement means measures the received signal strength a plurality of number of times at predetermined time intervals every unit time, calculates an average value of measurement values, compares the average value with a predetermined threshold value, and transfers the comparison result to said data terminal device as measurement data, and said reception quality display control means displays the measurement data transferred from said received signal strength measurement means as the information representing the reception quality on said control unit.

6. The mobile communication terminal apparatus according to claim 1, wherein said hand held phone further includes battery monitoring means for monitoring a state of the battery, and transferring the monitoring data to said data terminal device, while a mode for the mobile data communication is set, and wherein said data terminal device further includes battery information display control means for generating information representing a battery state based on the monitoring data of the battery state transferred from said hand held phone, and displaying the battery state information on the display unit of said control unit.

7. An apparatus according to claim 6, wherein said battery monitoring means detects a battery remaining capacity at predetermined time intervals, compares each detection value with a plurality of predetermined threshold values, and transfers information representing the comparison result to said data terminal device as the monitoring data, and said battery information display control means generates information representing the battery remaining capacity on the basis of the monitoring data transferred from said hand held phone, and displays the information on said control unit.

8. An apparatus according to claim 6, wherein said battery monitoring means detects a battery remaining capacity at predetermined time intervals, and transfers the detection values to said data terminal device as the monitoring data, and said battery information display control means compares each battery remaining capacity detection value transferred from said hand held phone with a plurality of predetermined threshold values, generates information representing the battery remaining capacity on the basis of information representing the comparison result, and displays the information on the display unit of said control unit.

9. An apparatus according to claim 7 or 8, wherein said battery information display control means checks if the comparison result between the battery remaining capacity detection value and the plurality of threshold values corresponds to a discharge end state or a nearly discharge end state of the battery, and if it is determined that the comparison result corresponds to the discharge end state or nearly the discharge end state, said battery information display control means displays a mark indicating that the battery remaining capacity has become zero.

10. An apparatus according to claim 9, wherein said battery information display control means flickers the mark indicating that the battery remaining capacity has become zero.

11. An apparatus according to claim 6, wherein said battery information display control means generates information representing a remaining communication time of said hand held phone on the basis of the monitoring data of the battery state transferred from said hand held phone, and displays the information on the display unit of said control unit.

12. An apparatus according to claim 6, wherein said battery information display control means generates information representing a consumption radio of the battery on the basis of the monitoring data of the battery state transferred from said hand held phone, and displays the information on the display unit of said control unit.

13. A hand held phone which is connected to a data terminal device having a predetermined communication control function required for performing a mobile data communication, and has a function of transmitting transmission data of said data terminal device to a base station via a radio channel, and receiving reception data coming from the base station via the radio channel and transferring the reception data to said data terminal device, comprising:

measurement means for measuring a received signal strength of a radio channel which is being received while a mode for the mobile data communication is set; and transfer means for transferring the measurement data obtained by said measurement means to said data terminal device, and displaying the transferred data on a control unit of said data terminal device.

14. A hand held phone which is connected to a data terminal device having a predetermined communication control function required for performing a mobile data communication, has a function of transmitting transmission data of said data terminal device to a base station via a radio channel, and receiving reception data coming from the base station via the radio channel and transferring the reception data to said data terminal device, and comprises a battery as a power supply, comprising:

battery monitoring means for monitoring a state of the battery while a mode for the mobile data communication is set; and battery monitoring data transfer means for transferring the monitoring data obtained by said battery monitoring data to said data terminal device, and displaying the transferred data on said data terminal device.

15. A hand held phone which is connected to a data terminal device having a predetermined communication control function required for performing a mobile data communication, and has a function of transmitting transmission data of said data terminal device to a base station via a radio channel, and receiving reception data coming from the base station via the radio channel and transferring the reception data to said data terminal device, comprising:

power-OFF request output means for, when an operation for turning off a power supply of said hand held phone is performed while a mode for the mobile data communication is set, outputting a power-OFF request to said data terminal device; and first power-OFF control means for, when a power-OFF instruction is sent back from said data terminal device after said power-OFF request output means outputs the power-OFF request, turning off the power supply of said hand held phone, and for, when a power-ON instruction is sent back, maintaining the power supply of said hand held phone in an ON state.

16. A hand held phone according to claim 15, further comprising second power-OFF control means for, when neither the power-OFF instruction nor the power-ON instruction are sent back within a predetermined period of time after the power-OFF request is output to said data terminal device, turning off the power supply of said hand held phone.

17. A data terminal device which comprises a control unit having a control function of performing a mobile data communication with a data terminal device of a communication partner via a hand held phone and a base station connected to the hand held phone via a radio channel, and a modem unit for connecting said control unit and the hand held phone and performing an interface operation for the mobile data communication under the control of said control unit, comprising:

reception quality display control means for, when measurement data of a received signal strength is transferred from the hand held phone, generating information representing reception quality on the basis of the transferred measurement data, and displaying the information on said control unit.

18. A data terminal device which comprises a control unit having a control function of performing a mobile data communication with a data terminal device of a communication partner via a hand held phone and a base station connected to the hand held phone via a radio channel, and a modem unit for connecting said control unit and the hand held phone and performing an interface operation for the mobile data communication under the control of said control unit, comprising:

battery information display control means for, when monitoring data representing a battery state of the hand held phone is transferred from the hand held phone, generating information representing the battery state of the hand held phone on the basis of the transferred monitoring data, and displaying the information on a display unit of said control unit.

19. A hand held phone for use in a radio system, wherein the hand held phone is connected with a base station over radio channels, and further connected with a data terminal device having a predetermined communication control function required for performing a mobile data communication, the hand held phone transmits forward data from the data terminal device to the base station over a first one of the radio channels and receives reverse data from the base station over a second one of the radio channels and transfers the received reverse data to the data terminal device, comprising:

measurement means for measuring a strength of the received reverse data while a mode for the mobile data communication is set;

transfer means for transferring the measured strength to the data terminal device;

control means for controlling a display unit of the data terminal device to display the transferred data.

20. A hand held phone for use in a radio system, wherein the hand held phone is connected with a base station over radio channels, and further connected with a data terminal device having a predetermined communication control function required for performing a mobile data communication, the hand held phone transmits forward data from the data terminal device to the base station over a first one of the radio channels and receives reverse data from the base station over a second one of the radio channels and transfers the received reverse data to the data terminal device, comprising:

battery monitoring means for monitoring a state of the battery;

transfer means for transferring the monitored state to the data terminal device; and causing means for causing a display of the terminal device to display the transferred data.

21. A hand held phone, coupled to a data terminal separated from the hand held phone, for transmitting data received from the data terminal to a base station via a radio channel and receiving data from the base station via the radio channel and transferring the received data to said data terminal, the data terminal for performing a predetermined communication control function necessary for mobile data communication, said hand held phone comprising:

a signal strength detector for measuring a received signal strength of a radio channel received while a mobile data communication mode is active; and a control circuit responsive to the signal strength detector for transferring measured signal strength data to the data terminal, the data terminal displaying reception quality based on the measured signal strength data.

22. The hand held phone of claim 21, where the mobile data communication mode is a cellular digital packet data mode.

23. A data terminal comprising:

a control unit having a control function of performing a mobile data communication via a hand held phone separated from the data terminal and a base station connected to the hand held phone via a radio channel with a data terminal of a communication partner;

a modem for interfacing said control unit and the hand held phone for the mobile data communication responsive to said control unit; and a display control circuit, responsive to measured signal strength data received from the hand held phone, for generating information representing reception quality based on the measured signal strength data and displaying the generated information on said control unit.

24. The data terminal of claim 23, where the mobile data communication is a cellular digital packet data communication.

* * * * *

(12) EX PARTE REEXAMINATION CERTIFICATE (10658th)
United States Patent
Ishikura et al.

(10) Number: US 6,052,565 C1
(45) Certificate Issued: Jul. 13, 2015

(54) MOBILE COMMUNICATION TERMINAL APPARATUS WITH DATA COMMUNICATION FUNCTION

(75) Inventors: Akira Ishikura, Tokyo (JP); Kuniyoshi Marui, Tokorozawa (JP)

(73) Assignee: KABUSHIKI KAISHA TOSHIBA, Saiwai-Ku, Kawasaki-Shi (JP)

Reexamination Request:
No. 90/013,171, Mar. 4, 2014

Reexamination Certificate for:
Patent No.: 6,052,565
Issued: Apr. 18, 2000
Appl. No.: 08/887,328
Filed: Jul. 2, 1997

(30) Foreign Application Priority Data

Jul. 3, 1996 (JP) ........................................ 8-173439

(51) Int. Cl.
*H04L 12/56* (2006.01)
*H04W 24/00* (2009.01)
*H04W 88/02* (2009.01)

(52) U.S. Cl.
CPC .............. *H04W 24/00* (2013.01); *H04W 88/02* (2013.01)

(58) Field of Classification Search
None
See application file for complete search history.

(56) References Cited

To view the complete listing of prior art documents cited during the proceeding for Reexamination Control Number 90/013,171, please refer to the USPTO's public Patent Application Information Retrieval (PAIR) system under the Display References tab.

*Primary Examiner* — Scott L Weaver

(57) ABSTRACT

During the CDPD mode period, RSSI data and battery capacity remaining determination data measured by a hand held phone HHP are periodically transferred to a personal computer PC, and are displayed on an LCD display of the personal computer PC. During the CDPD mode period, status data representing the operation state of the personal computer PC is transferred to and displayed on the hand held phone HHP. Furthermore, during the CSCD mode period, status data representing the operation state of the hand held phone HHP is transferred to the personal computer PC, and is displayed on the LCD display of the personal computer PC.

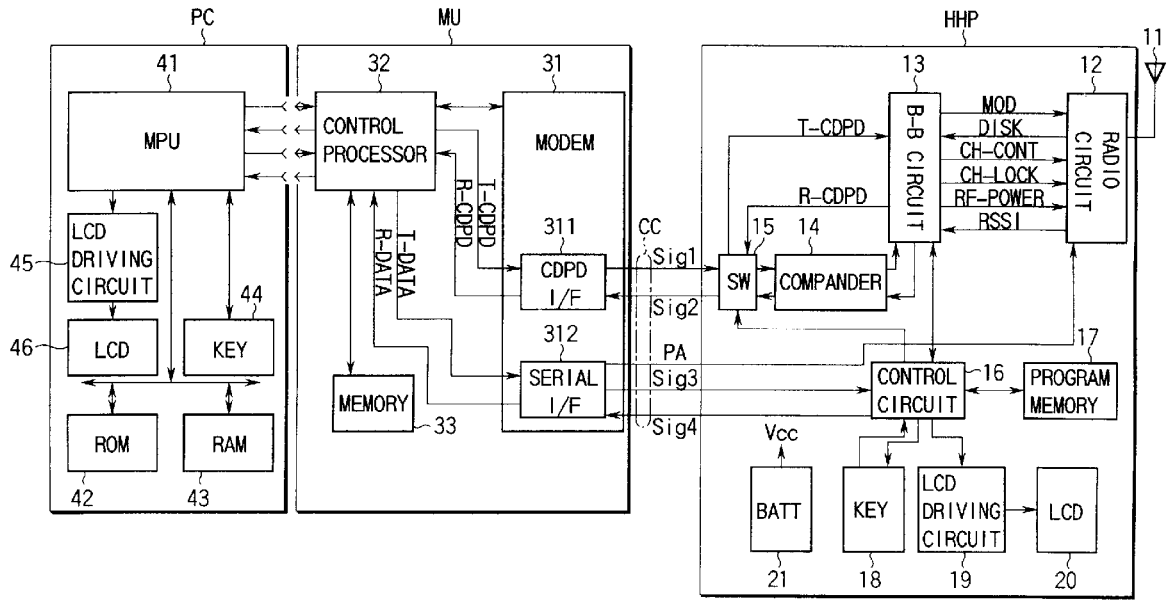

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 17-18, 23 and 24 are determined to be patentable as amended.

New claims 25-70 are added and determined to be patentable.

Claims 1-16 and 19-22 were not reexamined.

17. A data terminal device [which comprises] *comprising:*
a control unit having a control function of performing a mobile data communication with a data terminal device of a communication partner via a hand held phone and a base station connected to the hand held phone via a radio channel, [and] *the control unit comprises a display;*
a modem unit for connecting [said] *the* control unit and the hand held phone and performing an interface operation for the mobile data communication under the control of [said] *the* control unit[, comprising:] *; and*
reception quality display control means for, [when] *in response to the control unit establishing a connection for exchanging signaling with the hand held phone via the modem unit, periodically receiving* measurement data of a received signal strength [is] transferred from the hand held phone, *automatically* generating information representing reception quality on the basis of *and in response to receiving* the [transferred] measurement data, and *automatically* displaying *one or more signal strength indication patterns in response to the generating of the* information *representing reception quality* on [said] *the* display *of the* control unit.

18. A data terminal device [which comprises] *comprising:*
a control unit having a control function of performing a mobile data communication with a data terminal device of a communication partner via a hand held phone and a base station connected to the hand held phone via a radio channel, [and] *the control unit comprises a display unit;*
a modem unit for connecting [said] *the* control unit and the hand held phone and performing an interface operation for the mobile data communication under the control of [said] *the* control unit; *and*
battery information display control means for, [when] *in response to the control unit establishing a connection for exchanging signaling with the hand held phone via the modem unit, periodically receiving* monitoring data representing a battery state of the hand held phone *where the monitoring data* is transferred from the hand held phone, *automatically* generating information representing the battery state of the hand held phone on the basis of *and in response to receiving* the transferred monitoring data, and *automatically* displaying, *in response to the generating of the information representing the battery state of the hand held phone,* one or more regions of [a] *a battery capacity indication pattern* on [a] *the* display unit of [said] *the* control unit.

23. A data terminal *device* comprising:
a control unit having a control function of performing a mobile data communication via a hand held phone separated from the data terminal *device* and a base station connected to the hand held phone via a radio channel with a data terminal *device* of a communication partner, *the control unit comprises a display;*
a modem for interfacing [said] *the* control unit and the hand held phone for the mobile data communication responsive to [said] *the* control unit; and
a display control circuit, responsive to *the control unit establishing a connection for exchanging signaling with the hand held phone via the modem, periodically receiving* measured signal strength data transferred [received] from the hand held phone, [for] *automatically* generating information representing reception quality based on *and in response to receiving* the measured signal strength data, and *automatically* displaying *one or more signal strength indication patterns in response to the generating of* the [generated] information *representing reception quality* on [said] *the display of the* control unit.

24. The data terminal *device* of claim 23, where the mobile data communication is a cellular digital packet data communication.

25. *The data terminal device of claim 17 further comprising:*
*battery information display control means for, in response to the connection between the control unit and the hand held phone being established, periodically receiving monitoring data representing a battery state of the hand held phone where the monitoring data is transferred from the hand held phone, automatically generating information representing the battery state of the hand held phone on the basis of and in response to receiving the transferred monitoring data, and automatically displaying, in response to the generating of the information representing the battery state of the hand held phone, one or more regions of a battery capacity indication pattern on the display unit of the control unit.*

26. *The data terminal device of claim 18, wherein the battery information display control means comprises a processor and a display driving circuit.*

27. *The data terminal device of claim 23, wherein the display control circuit periodically receives the measured signal strength data and displays the one or more signal strength indication patterns without user intervention.*

28. *The data terminal device of claim 23, wherein the display control circuit is part of the control unit.*

29. *A data terminal device comprising:*
*a display;*
*a control unit coupled to the display, the control unit having a control function of performing a mobile data communication with a data terminal device of a communication partner via a hand held phone and a base station connected to the hand held phone via a radio channel;*
*a modem unit for connecting the control unit and the hand held phone and performing an interface operation for the mobile data communication under the control of the control unit;*
*reception quality display control means for, in response to the control unit establishing a connection for exchanging signaling with the hand held phone via the modem unit, periodically receiving measurement data of a received signal strength from the hand held phone with a periodicity of less than one hundred milliseconds (100 ms), automatically generating information representing reception quality on the basis of and in response to* receiving the measurement data, and automatically displaying one or more signal strength indication patterns in response to the generating of the information representing reception quality on the display of the control unit;

battery information display control means for, in response to the connection between the control unit and the hand held phone being established, periodically receiving monitoring data representing a battery state of the hand held phone transferred from the hand held phone, automatically generating information representing the battery state of the hand held phone on the basis of and in response to receiving the transferred monitoring data and automatically displaying, in response to the generating of the information representing the battery state of the hand held phone, one or more regions of a battery capacity indication pattern on the display unit of the control unit, wherein the reception quality display control means displaying (i) a first signal strength indication pattern when the measurement data corresponds to a first predetermined value, (ii) the first signal strength indication pattern and a second signal strength indication pattern that is non-contiguous with the first indication pattern and positioned laterally to the first signal strength indication pattern when the measurement data corresponds to a second predetermined value, and (iii) the first signal strength indication pattern, the second signal strength indication pattern and a third signal strength indication pattern that is non-contiguous with the first signal strength indication pattern and the second signal strength indication pattern and positioned laterally to the second signal strength indication pattern when the measurement data corresponds to a third predetermined value, wherein the battery information display control means displaying (i) a first region of the battery capacity indication pattern when the transferred monitoring data representing the battery state of the hand held phone corresponds to a first predetermined battery value, (ii) the first region and a second region of the battery capacity indication pattern when the transferred monitoring data representing the battery state of the hand held phone corresponds to a second predetermined battery value, and (iii) the first region, the second region and a third region of the battery capacity indication pattern when the transferred monitoring data representing the battery state of the hand held phone corresponds to a third predetermined battery value.

30. The data terminal device of claim 25, wherein the battery information display control means is part of the control unit.

31. The data terminal device of claim 30, wherein the battery information display control means periodically receiving the transferred monitoring data from the hand held phone starting after the connection between the control unit and the hand held phone is established while the radio channel is idle and automatically displaying the one or more regions of the battery capacity indication pattern in accordance with generated information representing the battery state of the hand held phone produced from the transferred monitoring data until the connection between the control unit and the hand held phone is terminated.

32. The data terminal device of claim 31, wherein termination of the connection between the control unit and the hand held phone occurs when the hand held phone is powered off.

33. The data terminal device of claim 31, wherein the periodicity of the transferred monitoring data is controlled by the hand held phone.

34. The data terminal device of claim 30, wherein the battery information display control means periodically receiving the transferred monitoring data comprises (i) receiving a first transferred monitoring data representing the battery state of the hand held phone at a first period of time, and (ii) receiving subsequent transferred monitoring data representing the battery state of the hand held phone at a second time period subsequent to the first time period, a transfer of the subsequent transferred monitoring data is initiated by the hand held phone in response to the connection between the control unit and the hand held phone remaining intact.

35. The data terminal device of claim 17, wherein the reception quality display control means comprises a processor and a display driving circuit.

36. The data terminal device of claim 17, wherein the reception quality display control means is part of the control unit.

37. The data terminal device of claim 36, wherein the reception quality display control means periodically receiving the measurement data from the hand held phone starting after the connection between the control unit and the hand held phone is established while the radio channel is idle and automatically displaying the one or more signal strength indication patterns in accordance with generated information representing reception quality produced from the transferred measurement data until the connection between the control unit and the hand held phone is terminated.

38. The data terminal device of claim 37, wherein termination of the connection between the control unit and the hand held phone occurs when the hand held phone is powered off.

39. The data terminal device of claim 37, wherein the periodicity of the measurement data is controlled by the hand held phone.

40. The data terminal device of claim 36, wherein the reception quality display control means periodically receiving the measurement data from the hand held phone until the connection between the control unit and the hand held phone is terminated, in response to the control unit establishing the connection with the hand held phone while the hand held phone is in an operation state at which no voice data is present on the radio channel.

41. The data terminal device of claim 36, wherein the reception quality display control means periodically receiving measurement data comprises (i) receiving a first measurement data associated with received signal strength of the hand held phone at a first period of time, and (ii) receiving subsequent measurement data associated with received signal strength measurement data at a second time period subsequent to the first time period, a transfer of the subsequent measurement data is initiated by the hand held phone in response to the connection between the control unit and the hand held phone remaining intact.

42. The data terminal device of claim 41, wherein the reception quality display control means automatically displaying the one or more signal strength indication patterns by (i) displaying a first group of one or more signal strength indication patterns in response to information representing reception quality that is generated based on the first measurement data and (ii) displaying a second group of one or more signal strength indication patterns in response to information representing reception quality that is generated based on the subsequent measurement data.

43. The data terminal device of claim 41, wherein the transfer of the subsequent measurement data is initiated by the hand held phone when the subsequent measurement data is received from the hand held phone absent any signaling from the data terminal device requesting to generate the subsequent measurement data.

44. The data terminal device of claim 36, wherein the connection between the control unit and the hand held phone commences prior to initial receipt of the measurement data by the reception quality display control means and terminates in response to signaling from the control unit.

45. The data terminal device of claim 17, wherein the reception quality display control means periodically receiving the measurement data of the received signal strength from the hand held phone in accordance with a time period equal to or less than one hundred milliseconds (100ms).

46. The data terminal device of claim 17, wherein the reception quality display control means periodically receiving measurement data comprises (i) receiving a first measurement data associated with received signal strength of the hand held phone at a first period of time and (ii) periodically receiving, in response to the connection between the control unit and the hand held phone remaining intact, subsequent measurement data associated with received signal strength of the hand held phone until termination of the connection between the control unit and the hand held phone.

47. The data terminal device of claim 17, wherein the reception quality display control means periodically receiving the measurement data of the received signal strength transferred from the hand held phone in response to the connection being established between the control unit and the hand held phone and the hand held phone operating in a state that differs from a state in which the hand held phone is transmitting data via the radio channel.

48. The data terminal device of claim 17, wherein the reception quality display control means periodically receiving the measurement data of the received signal strength transferred from the hand held phone in response to the connection being established between the control unit and the hand held phone and the terminal device operating in a state that differs from a state in which the data terminal device is transmitting data over the radio channel via the hand held phone.

49. The data terminal device of claim 17 further comprising status data display control means for receiving status data representing an operation state of the hand held phone and displaying the information representing the operation state of the hand held phone on the display of the control unit in response to receiving the status data,
 wherein the status data is different from (i) data associated with the received signal strength including the measurement data and (ii) monitoring data representing a battery state of the hand held phone.

50. The data terminal device of claim 17 further comprising status data display control means for displaying status data representing an operating state of the hand held phone, the status data is different from monitoring data representing a battery state of the hand held phone and data associated with the received signal strength including the measurement data.

51. The data terminal device of claim 50, wherein the status data identifies whether the hand held phone is in a busy state.

52. The data terminal device of claim 50, wherein the status data is used by the reception quality display control means to identify whether a radio channel connection between the hand held phone and the base station results in an error.

53. The data terminal device of claim 50, wherein the status data display control means displays the status data when the terminal device is operating in a state in which the hand held phone leads connection control between the data terminal device and the base station upon performing the mobile data communication.

54. The data terminal device of claim 50, wherein the status data display control means displays the status data when the terminal device is operating in a state in which a connection between the data terminal device and base station is established by a control of the hand held phone.

55. The data terminal device of claim 17, wherein the measurement data of the received signal strength received by the reception quality display control means represents a result produced by one or more arithmetic operations on signal strength data measured by the hand held phone.

56. The data terminal device of claim 18, wherein the battery information display control means is part of the control unit.

57. The data terminal device of claim 56, wherein the battery information display control means periodically receiving the monitoring data from the hand held phone starting after the connection between the control unit and the hand held phone is established while the radio channel is idle and automatically displaying the one or more regions of the battery capacity indication pattern in accordance with different generated information representing the battery state of the hand held phone produced from the transferred monitoring data until the connection between the control unit and the hand held phone is terminated.

58. The data terminal device of claim 57, wherein termination of the connection between the control unit and the hand held phone occurs when the hand held phone is powered off.

59. The data terminal device of claim 57, wherein the periodicity of the transferred monitoring data is controlled by the hand held phone.

60. The data terminal device of claim 56, wherein the battery information display control means periodically receiving the monitoring data comprises (i) receiving a first transferred monitoring data representing the battery state of the hand held phone at a first period of time, and (ii) receiving subsequent transferred monitoring data representing the battery state of the hand held phone at a second time period subsequent to the first time period, a transfer of the subsequent transferred monitoring data is initiated by the hand held phone in response to the connection between the control unit and the hand held phone remaining intact.

61. The data terminal device of claim 18 further comprising status data display control means for receiving status data representing an operation state of the hand held phone and displaying the information representing the operation state of the hand held phone on the display of the control unit in response to receiving the status data,
 wherein the status data is different from data associated with a received signal strength transferred from the hand held phone and the transferred monitoring data representing the battery state of the hand held phone.

62. The data terminal device of claim 18 further comprising status data display control means for displaying status data representing an operating state of the hand held phone, the status data is different from the transferred monitoring data representing the battery state of the hand held phone and data associated with a received signal strength transferred from the hand held phone.

63. The data terminal device of claim 62, wherein the status data identifies whether the hand held phone is in a busy state.

64. The data terminal device of claim 62, wherein the status data display control means displays the status data when the terminal device is operating in a state in which the hand held phone leads connection control between the data terminal device and the base station upon performing the mobile data communication.

65. The data terminal device of claim 62, wherein the status data display control means displays the status data when the terminal device is operating in a state in which a connection between the data terminal device and base station is established by a control of the hand held phone.

66. The data terminal device of claim 18 further comprising reception quality display control means for periodically receiving measurement data that represents a result produced by one or more arithmetic operations on signal strength data measured by the hand held phone in response to an establishment of the connection between the control unit and the hand held phone, automatically generating information representing reception quality on the basis of and in response to receiving the measurement data and automatically displaying one or more signal strength indication patterns in response to the generating of the information representing reception quality on the display of the control unit.

67. The data terminal device of claim 23, wherein the display control circuit further, in response to the connection between the control unit and the hand held phone being established, periodically receiving monitoring data representing a battery state of the hand held phone where the monitoring data is transferred from the hand held phone, automatically generating information representing the battery state of the hand held phone on the basis of and in response to receiving the transferred monitoring data, and automatically displaying, in response to the generating of the information representing the battery state of the hand held phone, one or more regions of a battery capacity indication pattern on the display unit of the control unit.

68. A data terminal device comprising:
a control unit having a control function of performing a mobile data communication via a hand held phone separated from the data terminal device and a base station connected to the hand held phone via a radio channel with a data terminal device of a communication partner, the control unit comprises a display;
a modem for interfacing the control unit and the hand held phone for the mobile data communication responsive to the control unit; and
a display control circuit, in response to the control unit establishing a connection for exchanging signaling with the hand held phone via the modem, periodically receiving measurement data that represents a result produced by a first arithmetic operation on signal strength data measured by the hand held phone, automatically generating information representing reception quality based on and in response to receiving the measurement data and automatically displaying one or more signal strength indication patterns in response to periodically generating the information representing reception quality on the display of the control unit.

69. The data terminal device of claim 68, wherein the display control circuit checks signal strength level by conducting a second arithmetic operation prior to displaying the one or more signal strength indication patterns based on the measurement data represents the result produced by the first arithmetic operations, the reception quality display control means generates the information representing reception quality based on the checked signal strength level.

70. The data terminal device of claim 68, wherein the display control circuit periodically receiving the measurement data from the hand held phone in accordance with a time period equal to or less than one hundred milliseconds (100 ms).

* * * * *